Nov. 3, 1959  W. F. STEAGALL  2,911,543
BISTABLE DEVICES
Filed Oct. 1, 1954  11 Sheets-Sheet 1

Complementing Magnetic Amplifier

Non-Complementing Magnetic Amplifier

INVENTOR
WILLIAM F. STEAGALL
BY
ATTORNEY

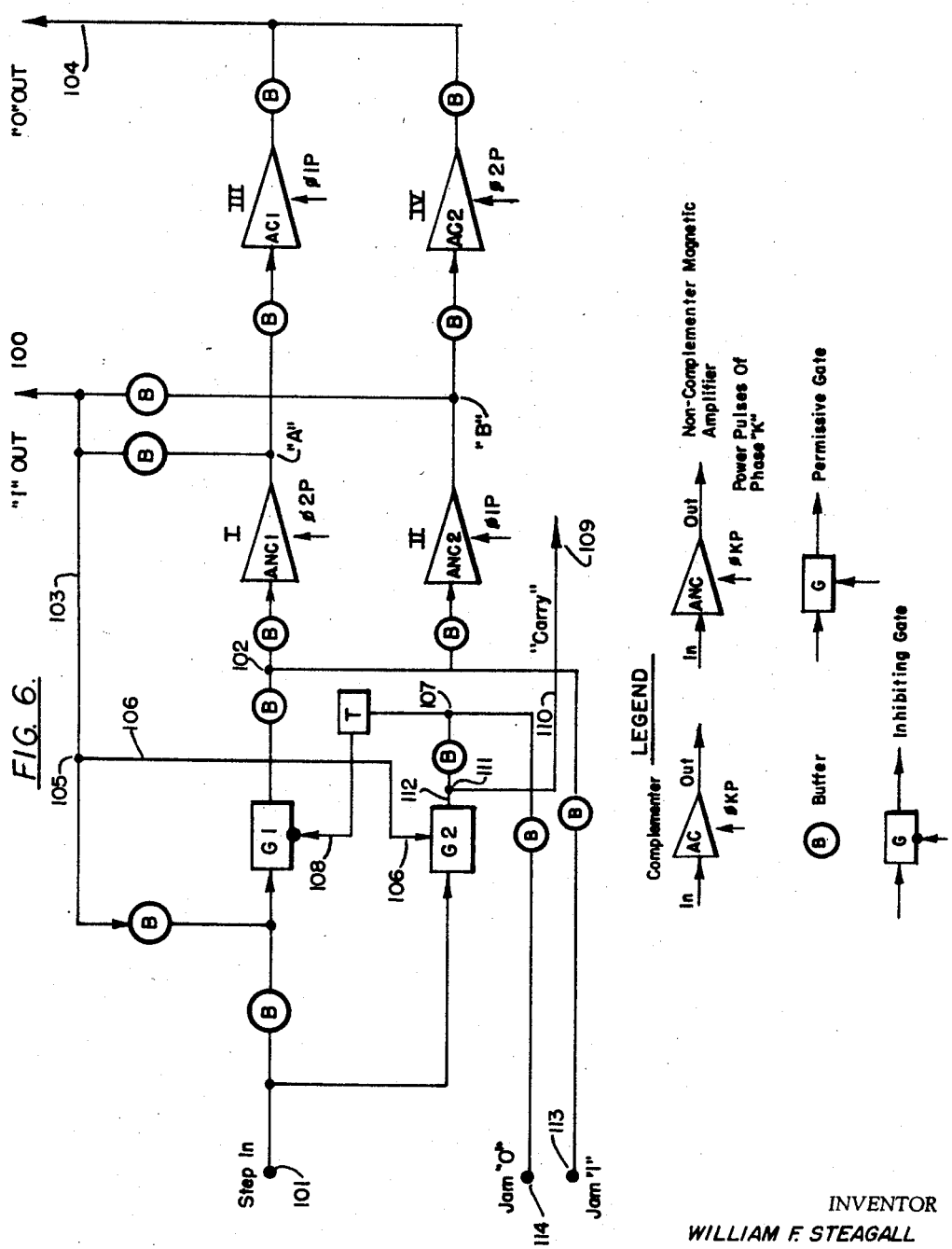

INVENTOR
WILLIAM F. STEAGALL

Nov. 3, 1959  W. F. STEAGALL  2,911,543
BISTABLE DEVICES
Filed Oct. 1, 1954  11 Sheets-Sheet 4

INVENTOR
WILLIAM F. STEAGALL

BY
ATTORNEY

Nov. 3, 1959  W. F. STEAGALL  2,911,543
BISTABLE DEVICES
Filed Oct. 1, 1954  11 Sheets-Sheet 8

INVENTOR
WILLIAM F. STEAGALL
BY
ATTORNEY

Nov. 3, 1959 W. F. STEAGALL 2,911,543
BISTABLE DEVICES
Filed Oct. 1, 1954 11 Sheets-Sheet 9

INVENTOR
WILLIAM F. STEAGALL
BY Ejerry Light
ATTORNEY

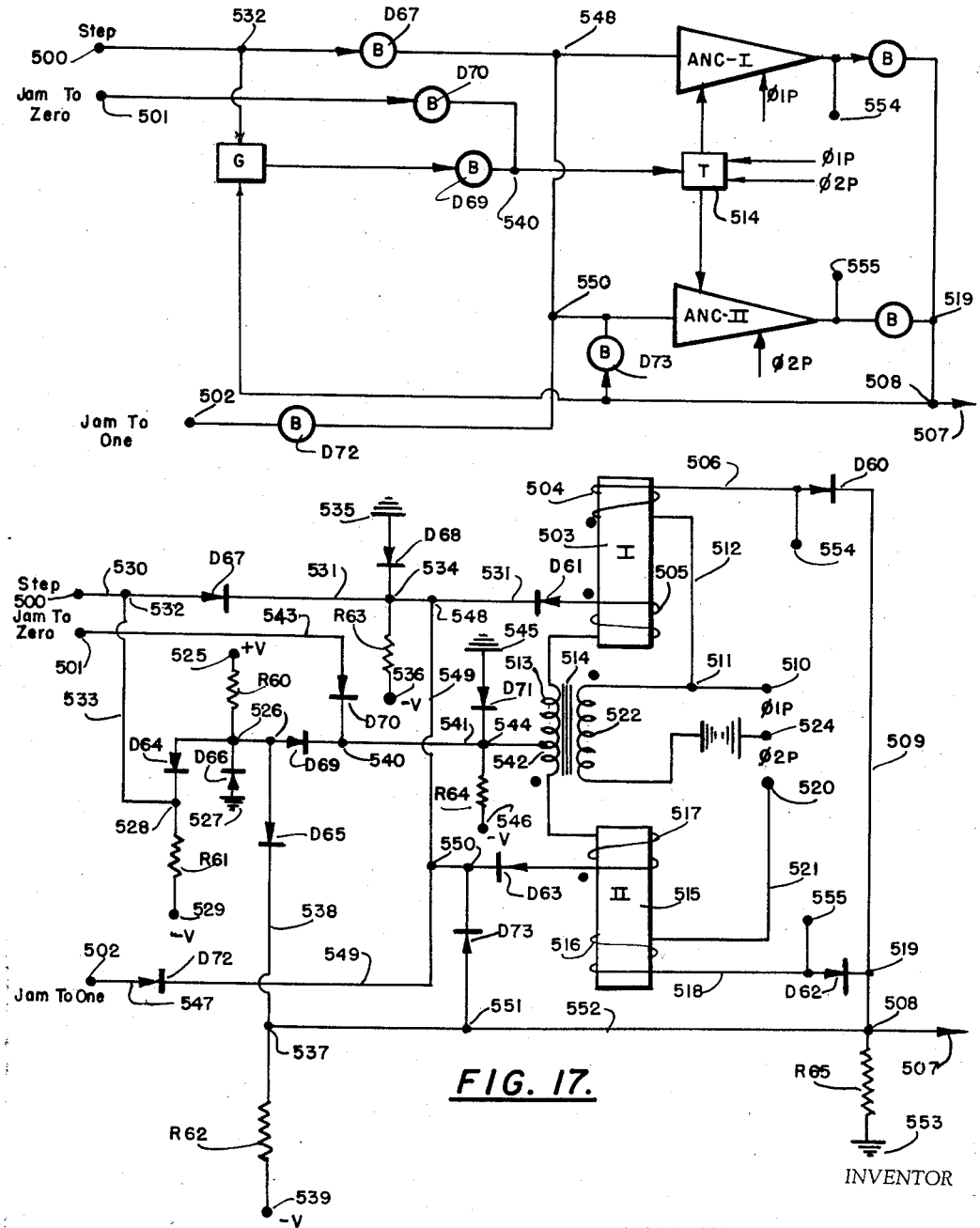

United States Patent Office 2,911,543
Patented Nov. 3, 1959

2,911,543
BISTABLE DEVICES

William F. Steagall, Merchantville, N.J., assignor to Sperry Rand Corporation, a corporation of Delaware Application October 1, 1954, Serial No. 459,760

15 Claims. (Cl. 307—88)

The present invention relates to bistable devices and is more particularly concerned with such devices in the nature of binary counters utilizing magnetic amplifiers.

As is well known, one of the basic components used in computing techniques, for instance, is the bistable device. Such devices may be used as counters, whereby successive input pulses on a single input line will cause the device to regularly change from one stable state of operation to another.

In the past, such bistable devices have normally been constructed in the form of vacuum tube circuitry, and while such circuitry is usually acceptable, it does have several disadvantages. First, the use of vacuum tubes results in a circuit unit which is relatively large in size, thereby making disposition of components within an overall installation rather difficult. Second, vacuum tubes are subject to breakage and, as a result, circuits utilizing such vacuum tubes are often relatively fragile. Again, in the normal course of operation, vacuum tubes are subject to normal operating failures, thus raising serious questions of maintenance and the cost attendant thereto.

Where, as here, reliability of operation is a factor of prime importance, vacuum tubes, even though acceptable for most present-day electronic applications, are faced with accuracy requirements of an entirely different order of magnitude. For example, if two devices each having 99.5% reliability response are both utilized in a combined relationship in a given device, that device will have an accuracy or reliability factor of .995×.995=99%. If ten such devices are combined, the factor drops to 95.5%. If, however, 500 such units are combined, the reliability factor of the device drops to 9.95%, and for a thousand, to 0.995%. It will thus be seen that even though the reliability of operation of individual vacuum tubes may be very much above 99.5%, where many thousands of units are combined, as in the large computers, the reliability factor of each unit must be extremely high to combine to produce an "error free" device. In practice of course such an ideal can only be approached. Magnetic amplifiers of the type here described meet the necessary requirements of reliability of performance for the combinations discussed.

In order to reduce failures due to the foregoing difficulties, other forms of electrical devices have been suggested for use in bistable circuits. One such other form is the magnetic amplifier and it is with this particular type of bistable device that the present invention is primarily concerned.

It is accordingly a prime object of the present invention to provide a novel bistable device utilizing magnetic amplifiers as the basic components thereof.

A further object of the present invention resides in the provision of a bistable device which is both inexpensive to construct and which exhibits considerable ruggedness.

A further object of the present invention is the provision of a bistable device which can be made in relatively small sizes.

Still another object of the present invention resides in the provision of a bistable device in the nature of a binary counter utilizing magnetic amplifiers.

Still another object of the present invention is the provision of a bistable device in the nature of a counter utilizing plural magnetic amplifiers and an interconnecting network for selectively causing the device to switch from one of its stable states to the other.

A still further object of the present invention resides in the provision of binary counter circuits which may respond to an input pulse of either of two predetermined phases.

The foregoing objects are achieved in the present invention by the provision of a bistable device which comprises two non-complementing magnetic amplifiers. In this respect it should be noted that a non-complementing magnetic amplifier is, by definition, one which will produce an output when an input is applied thereto, and which will, on the contrary, produce no output if an input is not applied. In accordance with the foregoing concept, the bistable devices of my invention utilize two such non-complementing magnetic amplifiers having the common output fed back to an input terminal common to the inputs of the two non-complementing magnetic amplifiers, whereby the output of one magnetic amplifier is applied to the input of the other magnetic amplifier to produce an output therefrom, and thus maintain a stable state wherein outputs occur alternately from the two non-complementing magnetic amplifiers. Clearly a selective interruption of the feedback process will produce a second stable condition of operation wherein neither amplifier produces outputs. To achieve the foregoing selective interruption of the feedback process, I provide a supplemental network utilizing at least a gate and a polarity inversion device, and in this respect the said inversion device may preferably be a suitable transformer, as will be described hereinbelow.

In one form of my invention the circuit is so arranged that it acts as a counter, namely, it has but a single input line for the reception of step input signals. In the embodiments of the invention here disclosed the circuits will accept either phase of input pulse at any one of three input terminals which are identified as the step input, jam-to-one terminal and the jam-to-zero terminal. The phase of the input signal has no effect upon the kind or state of operation achieved, but various operation sequences are obtained by the application of pulses to the several input terminals. Where the step input is used alone the device having such a terminal operates as a binary counter. When the jam-to-one and jam-to-zero terminals are used alone the device operates as a flip-flop. In the absence of a step input terminal the other two terminals are labeled "set" and "reset" for those devices which act only as flip-flops. Successive inputs applied to the step input successively change the state, while inputs must be applied alternatively to the jam-to-zero and jam-to-one terminals in order to achieve a successive change in state. Again, if several inputs are applied to one of the jam inputs, and no inputs are applied elsewhere, only one change in state may occur, and that only if the device was in the state alternate to that designated by the particular "jam" terminal under consideration.

Before proceeding with the description of my invention, several definitions of the subject matter to be discussed are advisable. The basic term "non-complementing magnetic amplifier" has already been discussed. It should also be mentioned that the invention to be described uses "complementing magnetic amplifiers." Such an amplifier is by definition one which will produce an output signal only in the absence of an input signal.

Several other definitions will be of value in the understanding of the present invention. As will be described, the several amplifiers employed in the bistable devices of my invention are energized by "power pulses." These pulses are preferably in the form of regularly occuring positive and negative going square waves although other wave shapes, such as sine waves, may be used if desired. In the disposition of components, some amplifiers will be fed by "phase 1 power pulses" and this term merely refers to such positive and negative going square wave pulses as timed with respect to an arbitrary datum. Other of the amplifiers will utilize "phase 2 power pulses" and it is to be understood that this latter term again refers to pulses of the same form as the phase 1 pulses with the sole exception that a positive going portion of a phase 1 pulse occurs during a negative going portion of a phase 2 pulse and vice versa. Again, it will become apparent from the following description that the several power pulses cooperate with input pulses to selectively produce or inhibit an output from the amplifier. These input pulses must ordinarily occur during a negative going portion of the power pulse with which it is to cooperate; and in this respect, therefore, when I speak of a "phase 1 input pulse" it is to be understood that this term refers to an input pulse occurring during a negative going portion of a phase 1 power pulse, or in brief, an input pulse which may effectively cooperate with a phase 1 power pulse. Similarly, a "phase 2 input pulse" is one which occurs during a negative going portion of a phase 2 power pulse, as will become apparent from the following description. A phase 1 input pulse cannot cooperate with a phase 2 power pulse, nor can a phase 2 input pulse cooperate with a phase 1 power pulse.

The foregoing objects, advantages and operation will become more readily apparent from the following description and accompanying drawings, in which:

Figure 6 is a logical diagram with a legend of one form of counter according to the invention.

Figure 16 is a logical diagram of another bistable device according to the invention.

Figure 17 is one detailed circuit diagram corresponding to the logical diagram of Figure 16.

Figure 1:
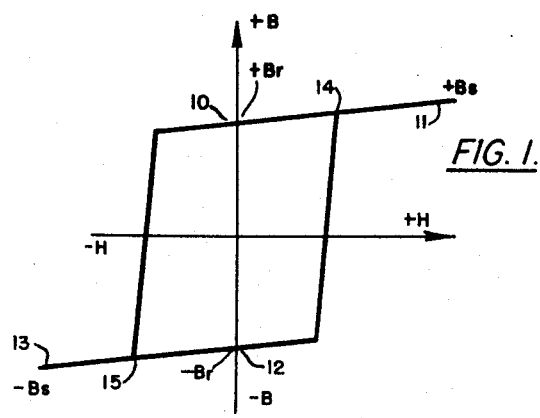
Figure 1 is an idealized hysteresis loop of a magnetic material which may preferably be employed in the cores of the magnetic amplifiers utilized in my invention.

Referring to Figure 1, the magnetic amplifiers of my invention preferably utilize magnetic cores exhibiting a substantially rectangular hysteresis loop. Such cores may be made of a variety of materials, among which are various types of ferrites and various kinds of magnetic tapes, including Orthonik and 4-79 Moly-Permalloy. These materials may have different heat treatments to give them different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores nor to any specific materials therefor, and the examples to be given are illustrative only. In the following description bar type cores have been utilized for ease of representation and for facility in showing winding directions. Further, although the following description refers to the use of materials having hysteresis loops substantially as shown in Figure 1, this again is done merely for ease of discussion; and other forms of hysteresis loops substantially in parallegram or in rectangular form may in fact be utilized. Thus, neither the precise core configuration nor core material to be discussed is mandatory and many variations will readily suggest themselves to those skilled in the art.

Returning now to the hysteresis loop shown in Figure 1, it will be noted that the curve exhibits several significant points of operation; namely, point 10 (+B$r$) which represents plus remanence; the point 11 (+B$s$) which represents plus saturation; the point 12 (−B$r$) which represents minus remanence; and the point 13 which represents minus saturation (−B$s$); and the points 14 and 15 which represent respectively the beginning of the regions of plus and minus saturation flux density.

Figure 4:
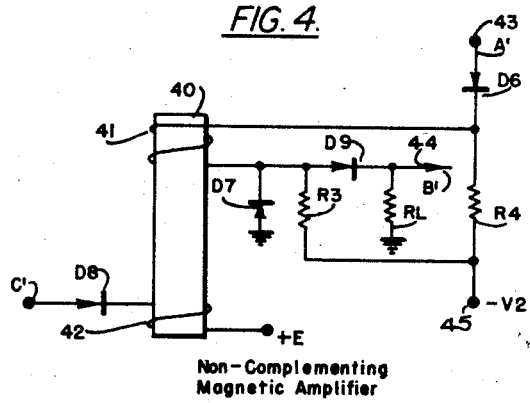
Figure 4 is a schematic representation of a basic non-complementing amplifier of the magnetic type.
Figure 5:
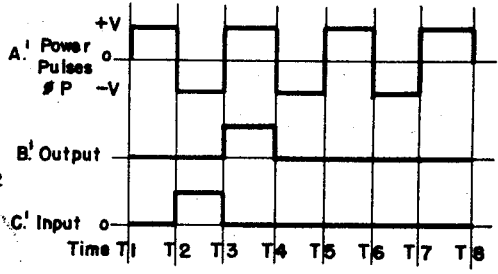
Figure 5(A', B' and C') are waveforms illustrating the operation of the non-complementing magnetic amplifier shown in Figure 4.

Discussing for the moment the operation of a device utilizing a core which exhibits a hysteresis loop such as is shown in Figure 1, let us assume that a coil is on the said core. If we should initially assume that the core is at an operating point 10 (plus remanence), and if a current should be passed through the coil on the said core in a direction such as to produce a magnetizing force in a direction of +H, that is in a direction tending to increase the flux in the said core in the same direction, the core will tend to be driven from point 10 (+B$r$) to point 11 (+B$s$). During this state of operation, there is relatively little flux change in the said core and the coil therefore presents a relatively low impedance whereby energy fed to the said coil during this state of operation will pass readily therethrough and may be utilized to effect a usable output. On the other hand, if the core should somehow be "flipped" from point 10 (+B$r$) to point 12 (−B$r$), prior to the application of a +H pulse, upon application of such a pulse the core will tend to be driven from the said point 12 (−B$r$) to the point 14. During this particular state of operation, there is a very large flux change in the said core and the coil therefore presents a relatively high impedance to the applied pulse. As a result, substantially all of the energy applied to the coil, when the core is initially at −B$r$, will be expended in flipping the core from point 12 to the beginning of the region of plus saturation, point 14, providing the size of the said +H pulse is properly chosen, with very little of this energy actually passing through the said coil to give a usable output. Thus, depending upon whether the core is initially at point 10 (+B$r$) or at point 12 (−B$r$), an applied pulse in the +H direction will be presented respectively with either a low impedance or a high impedance and will effect either a relatively large output or a relatively small output. These considerations are of great value in the construction of the basic magnetic amplifiers such as are shown in Figures 2 and 4.

Figure 2:
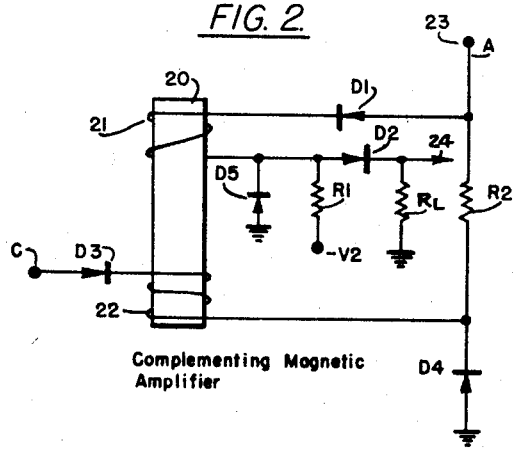
Figure 2 is a schematic representation of a simple complementing amplifier of the magnetic type.
Figure 3:
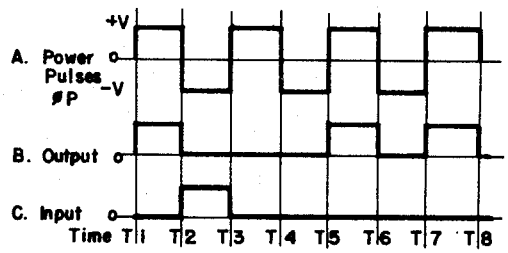
Figure 3(A, B and C) are waveworms illustrating the operation of the complementing magnetic amplifier shown in Figure 2.

Referring now to the circuit shown in Figure 2, and making reference to the waveform diagrams of Figure 3(A through C), it will be seen that a complementing magnetic amplifier provided in accordance with the present invention comprises a core 20 exhibiting a hysteresis loop preferably similar to that discussed in reference to Figure 1. The core 20 bears two windings thereon, namely, winding 21 which is termed the power or output winding and winding 22 which is termed the signal or input winding. One end of the power winding 21 is coupled to a diode D1, poled as shown; the anode of diode D1 is connected to an input terminal 23 to which terminal is fed a train of positive and negative going power pulses such as is shown in Figure 3A. (The schematic of Figure 2 includes letters A, B and C thereon and these letters refer to points of the circuit wherein the corresponding waveforms shown in Figures 3A through 3C inclusive will appear.) For purposes of the following discussion, the power pulses are shown to have a center value of zero volts and to exhibit excursions between $+V$ and $-V$ volts. Assuming now that the core is initially at the plus remanence point (point 10 of Figure 1), a positive going power pulse applied at terminal 23 during the time $t1$ to $t2$ will pass through the diode D1, through the relatively low impedance exhibited by power winding 21 and thence through diode D2 to an output point 24. As a result, an output pulse will appear at the terminal 24 during the time $t1$ to $t2$. At the end of the said positive going power pulse at time $t2$, and in the absence of signal inputs, the core will return to the operating point 10 and will remain at the said plus remanence point until a further positive going power pulse applied, for instance, during the time $t3$ to $t4$, will again tend to drive the core to plus saturation. Thus, in the absence of any other inputs, if the core 20 should initially be at plus remanence, successive positive going power pulses will cause successive outputs to appear at output terminal 25, in coincidence with the application of the said positive going power pulses.

Let us now assume, however, that an input pulse is applied during the time $t2$ to $t3$, such as is shown in Figure 3C. This input pulse passes through the diode D3 and through coil 22; and, as will be noted from Figure 2, inasmuch as the said coil 22 is wound in a direction opposite to that of coil 21 the said input pulse will effect a magnetizing force in a $-H$ direction on the core 20. Thus, during the time $t2$ to $t3$, the application of an input pulse as described will tend to cause the core to be flipped in a counterclockwise direction from the point 10 (plus remanence) to the region of point 13 shown in Figure 1, and preferably to just the beginning of the minus saturation region at point 15; and, at the end of the said input pulse at time $t3$, the core will find itself substantially at the operating point 12 (minus remanence) preparatory to the reception of the next positive going power pulse. This next positive going power pulse, appearing at terminal 23 during the said time $t3$ to $t4$, will therefore find the coil 21 to present a relatively high impedance, and as a result most of the energy presented by the said power pulse will be expended in flipping the core back to the region of point 11 ($+Bs$), and preferably to point 14 only, rather than in producing a usable output. Thus, as will be seen from an examination of Figure 3, the application of an input pulse during the negative going portion of a power pulse will effectively prevent the output of a usable pulse during the next succeeding positive going power pulse. The system thus acts as a complementer.

Continuing now with the showing of Figure 3, if no input pulse is again applied during the time $t4$ to $t5$, an output pulse will once more appear during the time $t5$ to $t6$. Since the power pulse appearing between time $t3$ to $t4$ caused the core once more to assume its plus remanence operating point, the next positive going input pulse will find the core still to be at this operating point and will again drive the core to plus saturation, giving the desired output.

While the foregoing discussion has described in essence the operation of a complementing magnetic amplifier in accordance with the present invention, several considerations should be noted for proper design of such an amplifier. First of all, the passage of current through coil 21, due to the application of a positive going power pulse at the terminal 23, will cause a small flux change to occur in the core 20 as described if the core is initially at point 10 ($+Br$), and this flux change will in turn tend to induce a small voltage in the signal coil 22. This induced voltage is negative at the cathode of D3 and positive at the cathode of D4, and although the induced voltage is small it is nevertheless necessary to prevent current from flowing in the lower winding 22 due to this small induced voltage. The combination of resistor R2 and diode D4 accomplishes this function by allowing the lower end of signal winding 22, connected to the junction of the said resistor R2 and diode D4, to attain the potential of the power pulse when the power pulse is positive. Since the base level of an input pulse, as applied through diode D3, is zero volts no current can flow due to the small induced voltage discussed previously.

Again, if the core 20 is initially at $-Br$, point 12, upon application of a positive going power pulse a relatively large flux change occurs in the core and a relatively large voltage of the previously discussed polarity is induced in the lower winding 22. The blocking action of the R2—D4 circuit still prevents current from flowing in the said lower winding 22 due to the said induced potential if there are fewer turns on winding 22 then are on power winding 21. According to principles well known in the art, this relationship between the number of turns on the winding must exist if a voltage gain is to be produced by the amplifier.

Again, it should be noted that when the power pulse shown in Figure 3A is negative going, only a negligible current can flow in diode D1. In this respect it has been assumed that the back resistance of the several diodes shown is infinite and that the forward resistance is zero. While this is not strictly true, these assumptions are convenient and do not substantially effect the explanation. Even though no current flows through the diode D1 during application of a negative going portion of the power pulse, current does flow in the R2—D4 circuit, the magnitude of this current being approximately $$\frac{V}{R2}$$

This current serves to hold the end of signal winding 22 connected to the junction of resistor R2 and diode D4 at approximately ground potential and as a result signal inputs applied through diode D3 during a negative going power pulse portion pass through the said diode D3 and winding 22, as previously discussed, to the junction of resistor R2 and diode D4 which is approximately at ground potential. It must further be noted that the current which flows in winding 22 as the result of an input pulse at the anode of diode D3 must produce sufficient magnetizing force to flip core 20 from plus remanence to minus remanence during the input pulse period. The value of current required to produce the said magnetizing force must not exceed the magnitude $$\frac{V}{R2}$$

but this condition is easily arranged by proper choice of resistor R2. Finally, even though the core 20 should initially be at its minus remanence point immediately prior to application of a positive going power pulse (the "no output" state), the said positive going power pulse, in flipping the core from the minus remanence point to the plus remanence point, will still cause a small current to flow through coil 21 and a small output to appear at the terminal 24 as a result. This small output is termed a "sneak output" and should desirably be suppressed. The resistor R1 and diode D5 effect such a sneak output suppression. In this respect the resistor R1 is so chosen that current flows from ground through diode D5, and through the said resistor R1, to a source of potential —$V_2$, which current has a magnitude equal to or greater than that of the sneak pulse current to be suppressed. As a result of resistor R1 and diode D5, therefore, only outputs substantially larger than the sneak output may appear at output terminal 24.

Summarizing the foregoing briefly, it will be seen that the basic circuitry of Figure 2 provides a complementing magnetic amplifier wherein outputs will appear from the said amplifier so long as no input signal is presented thereto during negative going portions of the power pulses applied; and, on the contrary, upon application of an input pulse during such a negative going power pulse portion no output will occur during the next succeeding positive going portion of the power pulse.

The foregoing design considerations are also present in part in the non-complementing amplifier shown in Figure 4, and their application to the circuit of Figure 4 will be readily apparent to those skilled in the art.

Discussing the basic operation of the device shown in the said Figure 4, therefore, it will be seen that a non-complementing magnetic amplifier in accordance with the present invention utilizes a magnetic core 40, preferably exhibiting a hysteresis loop substantially the same as that shown in Figure 1. This core 40 carries two windings thereon, namely, a power winding 41 and a signal input winding 42, but it should be noted that the signal input winding is reversely wound with respect to winding 22 of the device, as shown in Figure 2. Assuming now that the device is initially at the —$Br$ point seen in Figure 1, application of a positive going power pulse during the time $t1$ to $t2$ at power input terminal 43 will cause a current to flow through the diode D6 and winding 41. Inasmuch as the power pulse energy is for the most part expended in flipping the core from —$Br$ to +$Br$, only a sneak output, if any, will be present at output terminal 44 and this sneak output is effectively suppressed by the combination of resistor R3 and diode D7. The sneak suppressor circuit R3—D7 is directly analogous to the circuit R1—D5 discussed with reference to Figure 2. Thus, the core initially having been at the minus remanence point, no output pulse appears during the time $t1$ to $t2$ due to the application of a positive going power pulse.

Assuming for the moment that no input pulse was applied to the anode of diode D8 during the time $t2$ to $t3$, the negative going portion of the power pulse during this time period would cause diode D6 to be cut off. As a result, a reverse current will flow from ground through diode D7, through the said winding 41, thence through resistor R4, to terminal 45 which is connected to a source of negative voltage —$V_2$. Resistor R4 is so chosen that this reverse current flow is sufficient to flip the core from the +$Br$ point back to the —$Br$ point during the $t2$ to $t3$ time period. The next positive going power pulse during the time $t3$ to $t4$ will therefore once more be expended in merely flipping the core, and again, no usable output will be obtained. If now an input pulse should be applied during the time $t2$ to $t3$, coincident with the application of a negative going portion of a power pulse applied at terminal 43, this input pulse will pass current through the diode D8 and through coil 42 whereby a magnetomotive force equal to and in opposition to that produced by the said reverse current flow through coil 41 during this same period will be established. Thus, the application of an input pulse during the time $t2$ to $t3$ will effectively neutralize any magnetizing tendency of the reverse current flow through coil 41, and the core 40 will not therefore be flipped to the minus remanence point during this time period. As a result, the next positive going power pulse applied at terminal 43 during the time $t3$ to $t4$ will drive the core from plus remanence to plus saturation and will give a usable output at the terminal 44. If no input pulse is present during the time $t4$ to $t5$, the reverse current flow through coil 41 during this time again flips the core to the minus remanence point whereby again there will be no output during the time $t5$ to $t6$. As will be seen, therefore, the circuit of Figure 4 is in effect a non-complementing type of magnetic amplifier and no usable output will be obtained during a positive going portion of a power pulse unless an input pulse was present during the negative going portion of a power pulse immediately preceding it. The foregoing circuits readily lend themselves to the construction of bistable devices in accordance with the present invention.

Only one additional consideration should be noted in respect to the disposition of components shown in the circuit of Figure 4, and that is that in order to protect the input circuit (connected to the diode D8 to be discussed) against any interference from current flowing in the output winding 41, the signal winding 42 is returned to a positive voltage +$E$ which is equal and opposite in value to the voltage induced or generated in it by current flowing in the power winding 41 when reverse current flows through the said winding 41.

Figure 6 presents a logical diagram of one form of binary counter according to the invention, as set forth element by element in Figures 7–9, and later discussed in detail. In general, Figure 6 will be seen to comprise two non-complementing amplifiers I and II buffed together with a common output at terminal 100 which may be called the "one" output. The manner of connection enables the pair of coupled non-complementers to receive and utilize both phase one and phase two input signals, and to produce a full wave output which is fed back to maintain one stable state of the device.

Gate G1 is termed an inhibiting gate because a pulse, here assumed negative going, on wire 108 will prevent any output from the gate. A pulse on the other input to G1 will therefore pass through the gate only in the absence of a pulse on wire 108. Permissive gate G2 on the other hand, requires two simultaneous positive voltage inputs to pass a signal. One of these inputs is supplied by the feedback on wire 106 so that when the second input signal is applied to terminal 101 gate G2 has two simultaneous inputs and passes the signal which is inverted at T and inhibits G1 as explained above.

Initially, non-complementing magnetic amplifiers I and II may be assumed to be producing no output, which condition of operation is a first stable state of the device. If then a signal is applied at input terminal 101, this signal will pass inhibiting gate G1 and arrive at junction 102 from which it will be applied to the inputs of both non-complementing magnetic amplifiers I and II which are connected together as shown. The signal input at terminal 101 is also applied as input to permissive gate G2 but does not pass therethrough since the gate requires two simultaneous pulses to pass a signal, and there is at this time no pulse on line 106.

The non-complementing magnetic amplifier, the power pulse of which is negative at the time, will receive the signal and produce an output as described in detail below. This output will appear at terminal 100 and is fed back by wire 103 as an input to inhibiting gate G1, which remains open. This feedback pulse arrives in time to be accepted as a signal input by the other non-complementing magnetic amplifier which in turn produces an output which appears at terminal 100 and is also fed back by wire 103. The combined pulse outputs of non-complementers I and II produce in effect a steady positive voltage at output terminal 100, with resultant substantially direct current flow along feedback wire 103 to gate G1, and the output of said gate G1 acts as an input to non-complementing magnetic amplifiers I and II to produce a second steady state condition of the apparatus.

The outputs of non-complementing magnetic amplifiers I and II are supplied as inputs to complementing magnetic amplifiers III and IV, which are pulsed respectively with power pulses of opposite phase to that of non-complementers I and II. As III and IV are complementing magnetic amplifiers, they will, in the absence of inputs thereto from the ouputs of non-complementing magnetic amplifiers I and II, alternately produce outputs which combine to appear as a substantially steady voltage at "zero" output terminal 104.

As soon as non-complementing magnetic amplifiers I and II begin to produce outputs in the manner above described, the output signals are respectively applied to the complementing magnetic amplifiers III and IV which thereupon cease producing output signals. This action causes the voltage at "zero" terminal 104 to return to ground.

It will be noted that feedback wire 103 is connected at junction 105 with wire 106 leading to permissive gate G2, so that a positive voltage on feedback wire 103 is also supplied as an input to G2. If now a second signal pulse be applied to input terminal 101 it will be passed by gate G2. The signal pulse passed by permissive gate G2 appears at junction 107 from which it is applied to inverter transformer T which produces a negative going pulse which is applied to inhibiting gate G1 by wire 108. The negative going pulse on wire 108 prevents gate G1 from passing the signals applied thereto on wire 103 and terminal 101. Consequently, no input pulse is applied to the non-complementing magnetic amplifiers I and II during the duration of the said negative going pulse. As a result, non-complementing magnetic amplifiers I and II cease producing outputs. Feedback along wire 103 stops and complementing magnetic amplifiers III and IV begin to produce outputs which appear as a positive voltage at "zero" output terminal 104.

Carry output terminal 109 is connected by wire 110 to junction 111 with wire 112, connected to the output of permissive gate G2. Whenever a pulse is passed by gate G2 to inverter T it also appears at terminal 109. The pulses passed by gate G2 can be used as "carry" pulses because they appear only in response to alternate input signals at terminal 101; and in numeration with a binary radix a carry to the next succeeding higher column or position is required on every even pulse. The pulses appearing at terminal 109 may be employed to actuate counting mechanisms for just that purpose by utilizing the carry signal as an input signal to a subsequent unit of a cascade of bistable devices similar to that of Figure 6.

The jam "1" terminal 113 and jam "0" terminal 114 are connected to provide for conditioning signals to place the bistable device in the "one" or "zero" state, each representing a stable state of the device. A signal applied at terminal 113 applies an input directly to non-complementing magnetic amplifiers I and II which produce a voltage at terminal 100 and D.C. flow along feedback wire 103. This feedback maintains the "one" stable state. Terminal 104 is at ground potential because of inputs to complementing magnetic amplifiers III and IV from non-complementing magnetic amplifiers I and II. A signal applied to terminal 114 prevents any output from gate G1, stops input to both non-complementers I and II and complementers III and IV, resulting in a voltage rise at terminal 104. If signals are applied simultaneously to terminals 113 and 114 any interruption at gate G1 is overridden by the application of a positive pulse at junction 102 from terminal 113.

Figure 7:
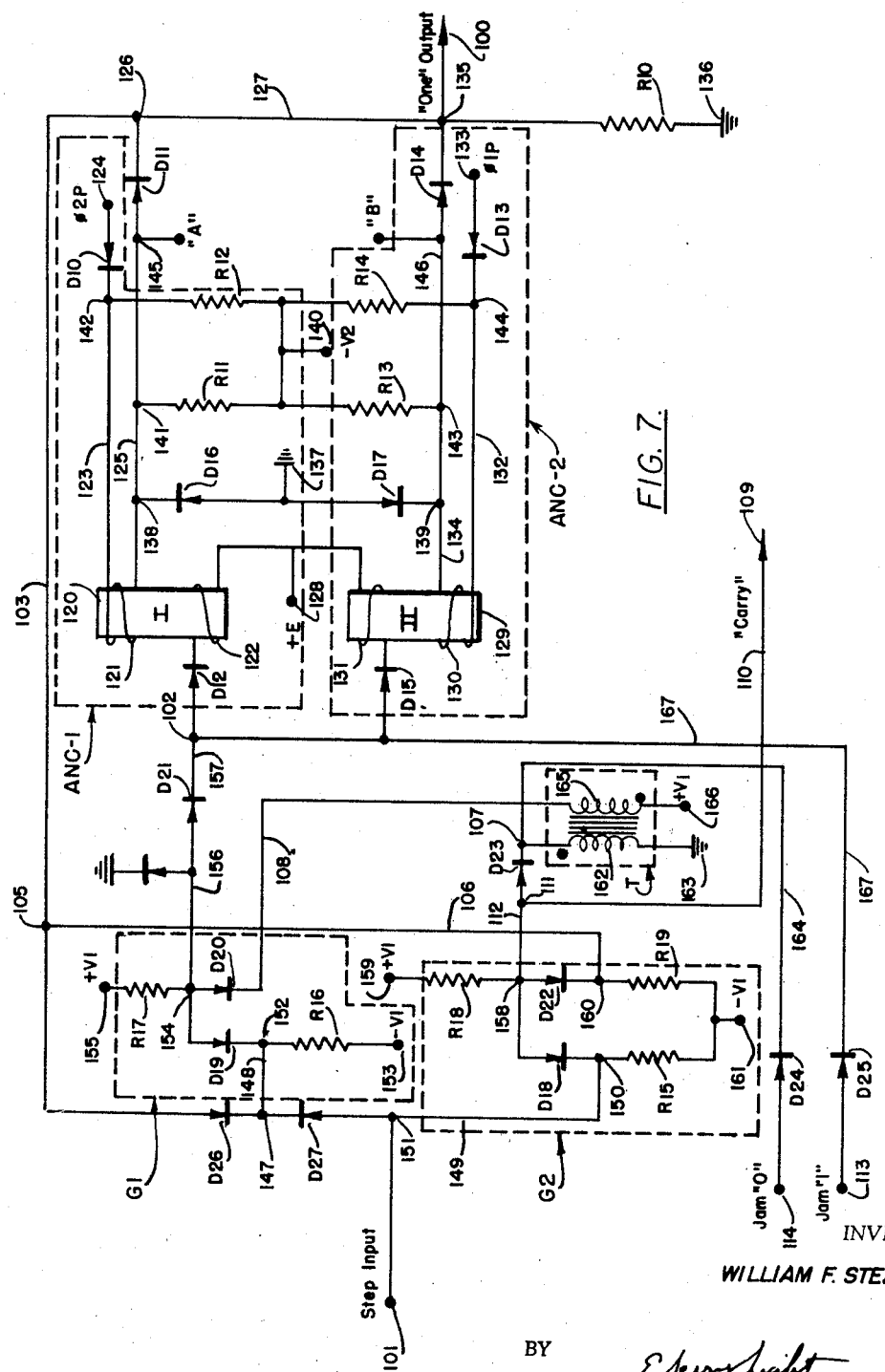
Figure 7 is one form of circuit diagram corresponding to part of Figure 6.
Figure 8:
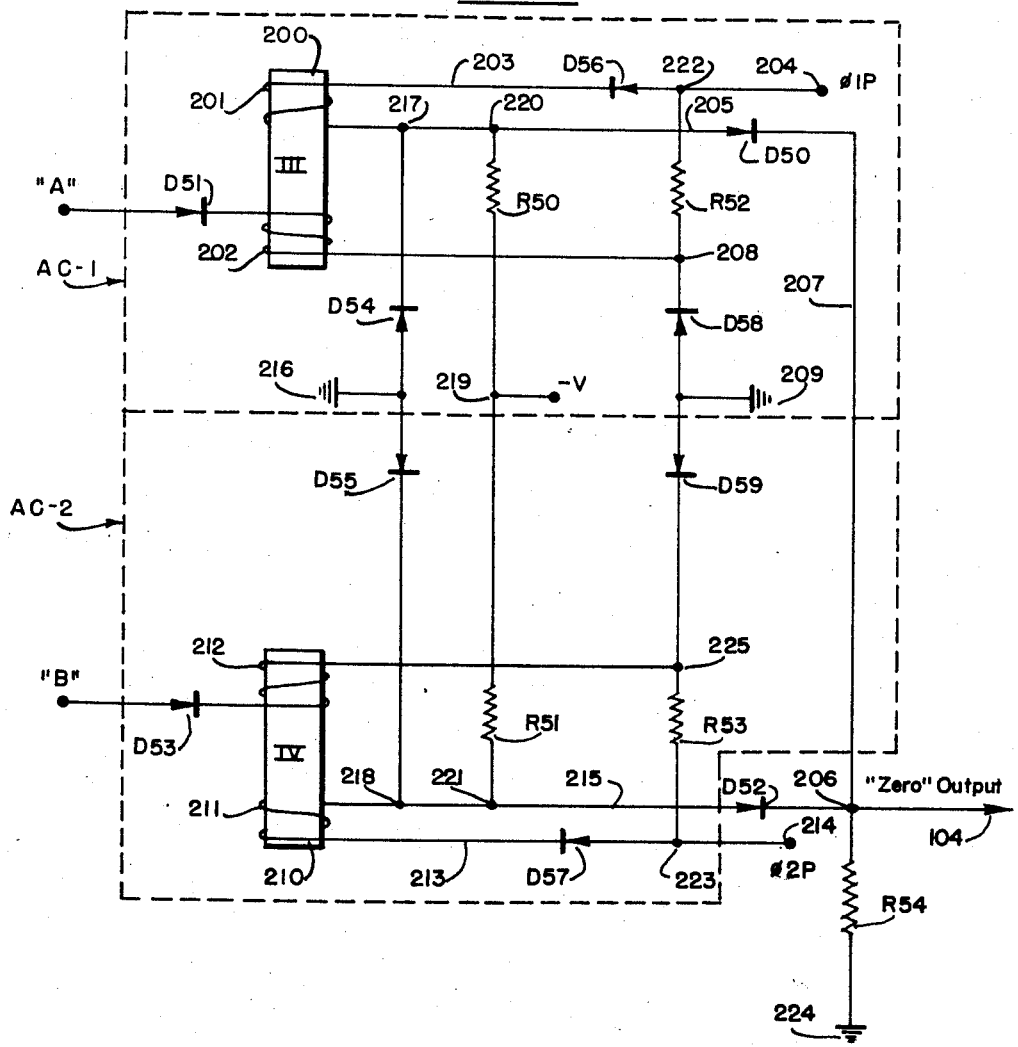
Figure 8 is one form of circuit diagram corresponding to part of Figure 6 with terminals for connection thereto and to the corresponding terminals in Figure 7.

Figures 7 and 8 comprise one form of detailed circuit corresponding to the logical diagram of Figure 6. Figure 7 shows a pair of non-complementing magnetic amplifiers I and II buffed together and connected to gating circuits for necessary control and the establishment of either one of two stable conditions of the bistable device. Figure 8 shows a pair of complementing magnetic amplifiers buffed together and provided with terminals "A" and "B" for connection to the circuit of Figure 7.

Non-complementing magnetic amplifier I comprises a core 120 of magnetic material, having a characteristic hysteresis curve preferably similar to that shown in Figure 1, and is provided with a power winding 121 and a signal winding 122. One terminal of power winding 121 is connected by wire 123 to the cathode of diode D10, the anode of which is connected to a source of phase two power pulses ($\phi 2P$) at terminal 124. The other terminal of power winding 121 is connected by wire 125 to the anode of diode D11, the cathode of which is connected to junction 126 with wire 127 and feedback wire 103. Signal winding 122 has one terminal connected to the cathode of diode D12 and its other terminal connected to $+E$ at terminal 128.

Non-complementing amplifier II comprises a core 129 similar to core 120 and having power pulse winding 130 and signal winding 131. Power winding 130 has one terminal connected by wire 132 to the cathode of diode D13, the anode of which is connected to a source of phase one power pulse ($\phi 1P$) at terminal 133. The other terminal of power winding 130 is connected by wire 134 to the anode of diode D14, the cathode of which is connected to junction 135 with wire 127, "one" output terminal 100 and load resistor R10. Load resistor R10 is grounded at 136. Signal winding 131 has one terminal connected to the cathode of diode D15 and the other connected to a source of positive potential $+E$, at terminal 128.

Diodes D16 and D17 have their anodes grounded at 137 and their cathodes connected to junction 138 with wire 125 and junction 139 with wire 134, respectively. Resistors R11, R12, R13 and R14 each have one terminal connected to $-V2$, a source of negative potential, at terminal 140 and their other terminals connected to junctions 141, 142, 143 and 144 with wires 125, 123, 134 and 132, each respectively. Terminals "A" and "B" are provided at junctions 145 and 146 with wires 125 and 134, respectively, for connection of the circuit of Figure 8 comprising complementers III and IV.

Feedback wire 103 contains junction 105 and is connected to the anode of diode D26. The cathodes of diodes D26 and D27 are connected to junction 147 with wire 148. Wire 149 connects the anode of diode D27 to the junction 150 with the cathode of diode D18 and one terminal of resistor R15. Wire 149 contains junction 151 to which step input terminal 101 is connected. Wire 148 connects junction 147 with junction 152 between the cathode of diode D19 and one terminal of resistor R16, the other terminal of which is connected to a source of negative potential $-V_1$, at 153. The anodes of diodes D19 and D20 are connected to junction 154 with one terminal of resistor R17, the other terminal of which is connected to a source of positive potential $+V_1$, at 155. Junction 154 is connected by wire 156 to the anode of diode D21, the cathode of which is connected to junction 102 by wire 157.

The anodes of diodes D18 and D22 are connected to junction 158 with one terminal of resistor R18, the other terminal of which is connected to $+V_1$ at 159. The cathode of diode D22 is connected to junction 160 with resistor R19, and feedback wire 106 leading from junction 105 with feedback wire 103. One terminal of each of the resistors R15 and R19 is connected to $-V_1$ at terminal 161. Junction 158 is connected by wire 112 to junction 111 with "carry" lead 110 and the anode of diode D23. The cathode of diode D23 is connected to junction 107 with one terminal of primary 162 of inverter transformer T, the other terminal of which is grounded at 163. Junction 107 is connected to the cathode of buffer diode D24 by wire 164, the anode of D24 being connected to injut jam "0" at terminal 114. The secondary 165 of inverter transformer T has one terminal connected to $+V_1$ at 166 and the other terminal connected to the cathode of diode D20 of inhibiting gate G1 by wire 108. It should be noted that the potential $+V_1$ at terminal 166 is not the same as the potential at, e.g., terminal 155. Terminal 166 should return to a potential equal to the signal input amplitude, while terminal 155, inter alia, returns to a larger potential. The jam "1" terminal 113 is connected to the anode of buffer diode D25, the cathode of which is connected to junction 102 with wire 157 and the anodes of buffer diodes D12 and D15 by wire 167.

A "zero" output may be provided by the pair of complementing magnetic amplifiers III and IV shown buffed together in Figure 8, by connecting terminal "A" of Figure 7 to terminal "A" of Figure 8, and terminal "B" of Figure 7 to terminal "B" of Figure 8.

Complementing magnetic amplifier III comprises a core 200 of magnetic material, having a characteristic hysteresis curve preferably similar to that shown in Figure 1, and is provided with a power winding 201 and a signal winding 202. One terminal of power winding 201 is connected by wire 203 to the cathode of diode D56, the anode of which is connected to a source of phase one power pulses ($\phi 1P$) at terminal 204. The other terminal of power winding 201 is connected by wire 205 to the anode of diode D50, the cathode of which is connected to junction 206 by wire 207. Signal winding 202 has one terminal connected to the cathode of diode D51. The other terminal of signal winding 202 is connected to junction 208 with resistor R52 and the cathode of diode D58, the anode of which is grounded at 209.

Complementing magnetic amplifier IV comprises a core 210 of magnetic material having a characteristic hysteresis loop similar to that shown in Figure 1 which is provided with a power winding 211 and a signal winding 212. One terminal of power winding 211 is connected by wire 213 to the cathode of diode D57, the anode of which is connected to a source of phase two power pulses ($\phi 2P$) at terminal 214. The other terminal of power winding 211 is connected by wire 215 to the anode of diode D52, the cathode of which is connected to junction 206. Signal winding 212 has one terminal connected to the cathode of diode D53. The other terminal of winding 212 is connected to junction 225 with resistor R53 at the cathode of diode D54, the anode of which is grounded at 209.

The anodes of diodes D54 and D55 are grounded at 216 and have their cathodes connected, respectively, to junction 217 with wire 205 and junction 218 with wire 215. Resistors R50 and R51 each have one terminal connected to a source of negative potential, $-V$, at junction 219 and their other terminals connected respectively to junction 220 with wire 205 and junction 221 with wire 215. Resistors R52 and R53 each have one terminal connected to junctions 208 and 225, respectively, and their other terminals, respectively, connected to junction 222 with the anode of D56 and terminal 204 and junction 223 with the anode of D57 and terminal 214.

Junction 206 is connected to ground 224 through load resistor R54. The anodes of diodes D51 and D53 are connected, respectively, to terminals "A" and "B" for combination with the circuit of Figure 7.

Referring now to the combined circuit of Figures 7 and 8 and comparing it with the logical diagram of Figure 6, it will be seen that the following sub-combinations are present:

Inhibiting gate G1 includes diodes D19 and D20 with resistors R16 and R17. Permissive gate G2 includes diodes D18 and D22 with resistors R15, R18 and R19. Non-complementing magnetic amplifier I includes the core 120 with its windings 121 and 122, diodes D10, D11, D12 and D16 and resistors R11 and R12. Non-complementing magnetic amplifier II includes core 129 with its windings 130 and 131, diodes D13, D14, D17 and resistors R13 and R14. Complementing magnetic amplifier III includes core 200 with its windings 201 and 202, diodes D50, D54, D58 and D56 and resistors R50 and R52. Complementing magnetic amplifier IV includes core 210 with its windings 211 and 212, diodes D52, D53, D55, D59, and D57 and resistors R51 and R53.

The operation of the particular form of the invention disclosed in Figures 7 and 8 is discussed below in detail in conjunction with the wave diagram of Figure 9.

Figure 9:
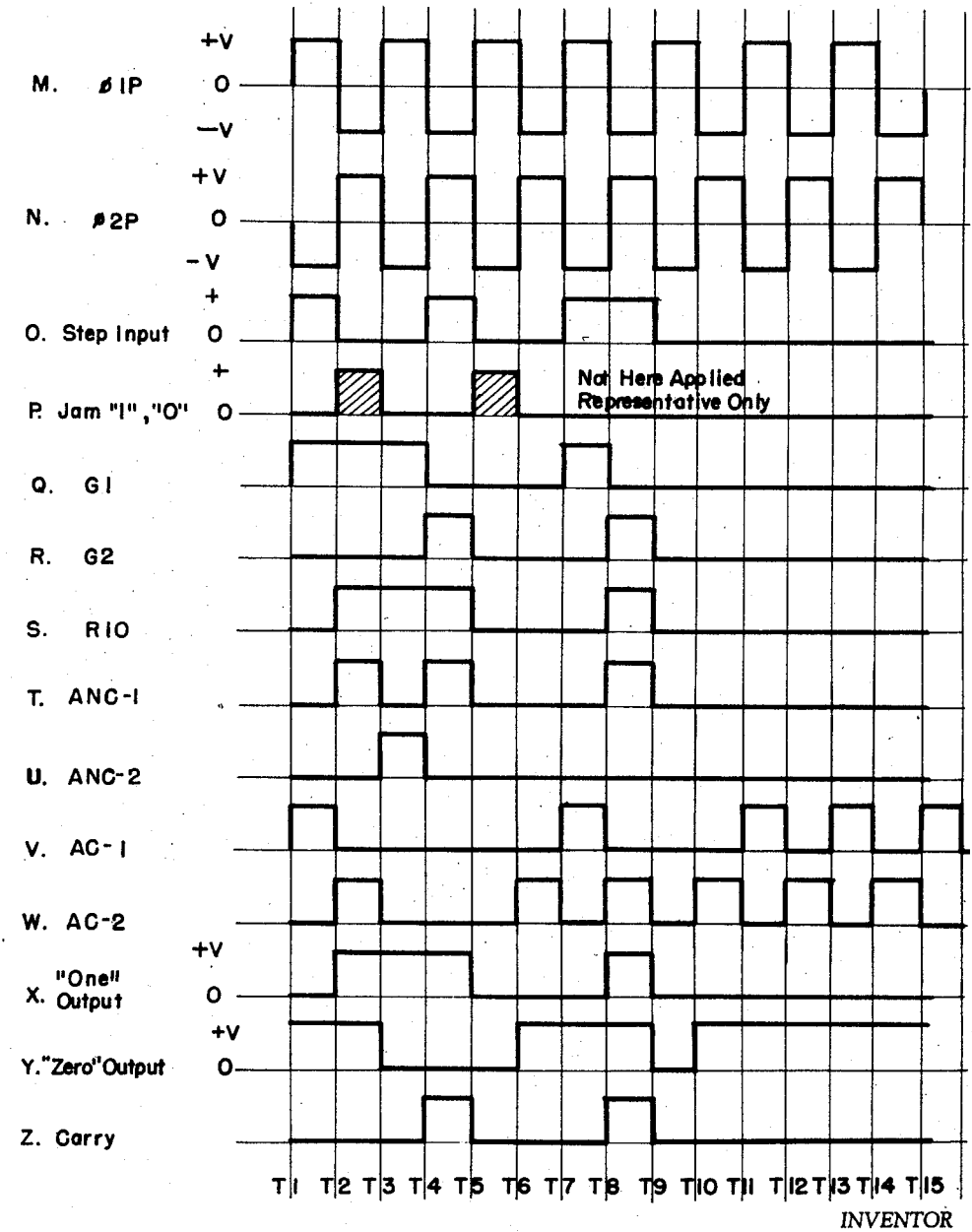
Figure 9 is a wave diagram with respect to time of one sequence of operation of Figures 6, 7 and 8.

In Figure 9 curve M represents phase one power pulses ($\phi 1P$) and curve N represents phase two power pulses ($\phi 2P$). As shown, these curves represent trains of square top waves which differ only in their phase relation, $\phi 1P$ being positive going during the initial period $t1-t2$ and $\phi 2P$ being negative going during this period. From the discussion of Figures 2 through 5 it will be remembered that, with the assumed form of construction which is not to be taken as limiting, the magnetic amplifiers will accept a signal pulse only during the negative going portion of the power pulses by which they are individually actuated.

Amplifiers I and IV are shown connected to a source of power pulses of phase $\phi 2P$ and as this train of power pulses is negative going during the time periods $t1-t2$, $t3-t4$, $t5-t6$, etc., these amplifiers will accept signal pulses during these periods. This action occurs because, as was discussed above with reference to Figures 2 and 4, the several input diodes are necessarily biased off during the positive going portions of the associated power pulses in order to prevent the currents flowing in the output windings from producing currents in the input windings. Amplifiers II and III function in the same way, but in opposite phase and will accept signals only during the time periods $t2-t3$, $t4-t5$, $t6-t7$, etc. During the operation of the device this action of the power pulse trains is continuous and at any arbitrary instant of time, $t1$, it may be assumed that pulse train $\phi 1P$ is positive going and pulse train $\phi 2P$ is negative going. It may also be assumed that the device is operating in what may be termed its "zero" condition which means that the "one" output terminal 100 is at ground potential and the "zero" output terminal 104 is at $+V$ potential as shown at curves X and Y of Figure 9. This condition may be termed a first stable state of the apparatus.

At the instant $t1$ the material of core 120 of non-complementer I is assumed to be at positive remanence, $+Br$. During the interval $t1-t2$ the negative portion of power pulse $\phi 2P$ is blocked at diode D10. In the absence of any signal pulse at buffer diode D12 a reverse current flow from ground 137 through diode D16, winding 121, and R12 to $-V2$ at terminal 140 will flip the core 120 back to negative remanence, $-Br$, so as to be ready for the next positive pulse of $\phi 2P$ during $t2-t3$ which will flip core 120 to $+Br$. The action of sneak suppressor circuit comprising ground 137, diode D16, resistor R11 and V2 at terminal 140 is the same as that discussed in connection with Figure 4.

At the same instant, $t1$, the material of core 129 is at negative remanence, $-Br$, and the positive portion of power pulse $\phi 1P$ flips the core to $+Br$ from which, in the absence of an input signal, it is returned during $t2-t3$ to $-Br$ by the reverse current flow from ground 137 through D17, winding 130 and R14 to $-V2$ at terminal 140. The negative pulse of $\phi 1P$ is blocked at D13 during interval $t2-t3$. Here again the other circuit elements function as described in connection with Figure 4.

If such action continues there will be no output at terminals "A" and "B" and therefore none at terminal 100. With no output from non-complementers I and II there is no input to complementers III and IV which proceed to produce outputs alternately, the operation of each being as described in connection with Figure 2.

At the instant $t1$ the core 200 is assumed to be at $+Br$ and the action of $\phi 1P$ during the interval $t1$ to $t2$ drives the core to $+Bs$ producing an output pulse at terminal 104, after which core 200 returns to $+Br$. In the absence of any signal at terminal "A" during the interval $t2-t3$, core remains at $+Br$. As noted in connection with Figure 2, a current of value $$\frac{V}{R52}$$

holds the terminal of winding 202 connected at 208 at ground during the negative going portions of the phase one power pulse. During the interval $t1-t2$ core 210 remains at $+Br$ and the negative portion of pulse $\phi 2P$ is blocked at D57. In the absence of any signal at terminal "B" during interval $t1-t2$ amplifier core 210 is driven to $+Bs$ during the interval $t2-t3$ and produces a pulse at junction 206 which combines with the output from amplifier III to produce a substantially continuous signal at terminal 104 as represented by the interval $t1-t3$ of curve Y of Figure 9. Under these conditions amplifiers I and II produce no outputs and amplifiers III and IV produce outputs alternately in successive time periods. Curves O, Q, R, S, T, U, X and Z would be blank under these conditions and curve Y would show a steady state value of $+V$.

If, with the above assumed initial conditions of amplifiers I through IV, a positive signal pulse is applied during the interval $t1-t2$ to "step input" terminal 101, as shown in curve O of Figure 9, the following action occurs. The pulse passes diode D27, junctions 147 and 152 to gate G1. As the cathode of diode D20 has a voltage $+V1$ applied thereto from terminal 166 the signal pulse passes gate G1 and diode D21 to junction 102 where it is applied to both diodes D12 and D15. The signal will be accepted by amplifier I because the power pulse $\phi 2P$ applied to terminal 124 is negative going at this time and blocked at D10. The signal current in winding 122 opposes the reverse current flow in winding 121 discussed above and core 120 remains at $+Br$. During the time interval $t2-t3$ amplifier II operates as before, but a positive pulse $\phi 2P$ is now passed by D10 and the resulting current in winding 121 creates a field which drives core 120 to $+Bs$ and produces an output pulse at junction 126. This pulse appears at "one" output terminal 100 during the interval $t2-t3$ as shown by curve X of Figure 9, and is also fed back by feedback wire 103 through diode D26 to junctions 147 and 152 where it acts as an input signal, is passed by gate G1 and arrives at junction 102. This fed back input signal is applied to diodes D12 and D15 during the time $t2-t3$ and is accepted by amplifier II. The signal voltage applied to winding 131 opposes the resetting or reverse current flow and core 129 remains at $+Br$. As a result the power pulse $\phi 1P$ drives core 129 to $+Bs$ during $t3-t4$ and produces an output at junction 135 and terminal 100 as shown by curve X. The output of amplifier II is likewise fed back by wire 103 and a D.C. flow is established in wires 127 and 157 and also through load resistor R10 to ground 136.

The above condition represents a second stable state of the apparatus and will continue until interrupted. For this state, as it will be seen from the time interval $t3-t4$ on Figure 9 curves Q and S, both G1 and R10 have a positive voltage along with "one" output terminal 100. The single interval delay in voltage level between curve Q and the curves S and X arises from the action of the amplifiers which produce their desired actions of output or no output one interval later than the signal or lack of signal controlling them. Compare, for example, the curves T, U, V and W with their respective power pulse trains shown by curves M and N and the signal input curve O. Curve X now has a steady state value $+V$ and curve Y is zero as is also curve Z.

If now a second step input signal is applied at terminal 101 during the interval $t4-t5$, as shown in curve O, the following action takes place. The positive going signal pulse passes diode D27 and appears at junction 152 of inhibiting gate G1. At the same time it appears at junction 150 of permissive gate G2. As at this same instant, $t4$, there is a positive voltage $+V$ applied to terminal 160 by wire 106 leading from junction 105 with feedback wire 103, the gate G2 passes the signal pulse which then appears at junction 111 and at "carry" terminal 109 as shown on curve Z. The pulse also continues through diode D23 to junction 107 and returns to ground at 163 through primary 162 of inverter transformer T. The pulse reappears in secondary 165 as a negative going pulse and is applied by wire 108 to diode D20 of gate G1 which blocks the passage of both the signal pulse and the D.C. feedback appearing at junction 152. This blocking action of gate G1 interrupts the input signal to non-complementing magnetic amplifiers I and II which cease to produce outputs. As a result, voltage at terminals "A" and "B" drops, and complementing magnetic amplifiers III and IV, lacking input signals, begin to produce outputs as shown by curves V and W. The voltage of curve X drops to zero and that of curve Y rises to $+V$. Although the voltage of terminals 100 and 104 remains constant until a third input as shown on curve O at $t7$, the carry curve Z shows only a single pulse at terminal 109.

The step input just referred to will be seen to be a double one, lasting from $t7$ to $t9$. The effect is that of two separate inputs and changes the state of the device twice in the adjacent time intervals $t7-t8$ and $t8-t9$. The actions just described above will occur sequentially and it will be noted that a carry output signal occurs in curve Z in interval $t8-t9$ corresponding to the second of the adjacent input signals. As a result of the four input signals, the device is left in its original condition after the instant $t10$. As shown by curves T and U, amplifiers I and II and therefore curve X, representing "one" output terminal 100, show no output. At the same time complementer amplifiers III and IV produce the alternate outputs shown in curves V and W which combine to form the steady state output of curve Y.

The delay of a time interval between the pulse shown on curve X during $t8-t9$ and the space on curve Y during $t9-t10$ illustrates the possibilities of such use of amplifiers cascaded together to obtain any desired time delay by adding an amplifier for each added interval of delay desired.

The curve P is shaded to show that these pulses have not been actually applied and so do not affect the other curves. These jam pulses are employed to set the device initially in one or the other of its two stable states. Jam "1" terminal 113 is connected through buffer diode D25 to junction 102. A pulse applied here overrides all else and establishes output at terminal 100, eliminating any which might exist at 104. Jam "0" terminal 114 is connected through buffer diode D24 to junction 107 and primary 163 of inverter transformer T. A pulse applied at 114 causes an inverted pulse to appear at diode D20, which blocks gate G1 and interrupts the feed back, whereby signal input to amplifiers I and II is stopped, the voltage at terminal 100 drops to ground and complementing magnetic amplifiers III and IV begin to produce outputs, raising terminal 104 to $+V$. Diode D23 blocks any jam "0" pulse from "carry" terminal 109. If pulses are applied simultaneously at 113 and 114, the jam "1" would override the jam "0" signal because the jam "1" signal is connected directly to terminal 102. Thus if the two "jam" signals are of equal duration, the output from one of the two amplifiers reaches G1 after the negative pulse induced at 165 has gone and $+V1$ is reestablished at D20 with the result that gate G1 passes the feedback signal and a substantially constant current is established in wire 157 and load resistor R10.

Figure 10:
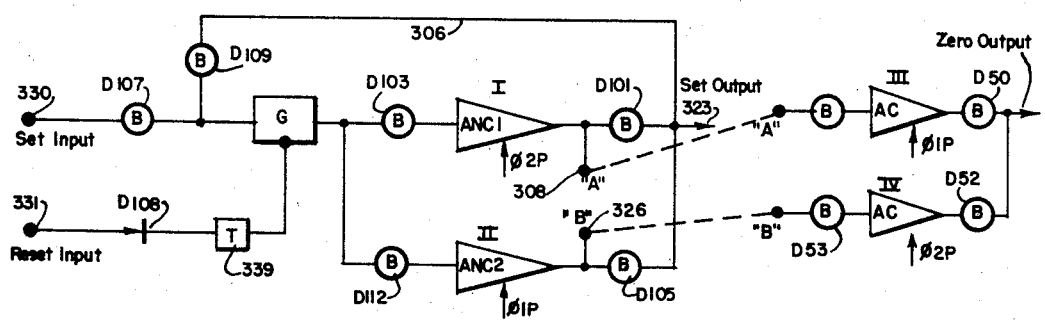
Figure 10 is a logical diagram of a flip-flop according to the invention.
Figure 11:
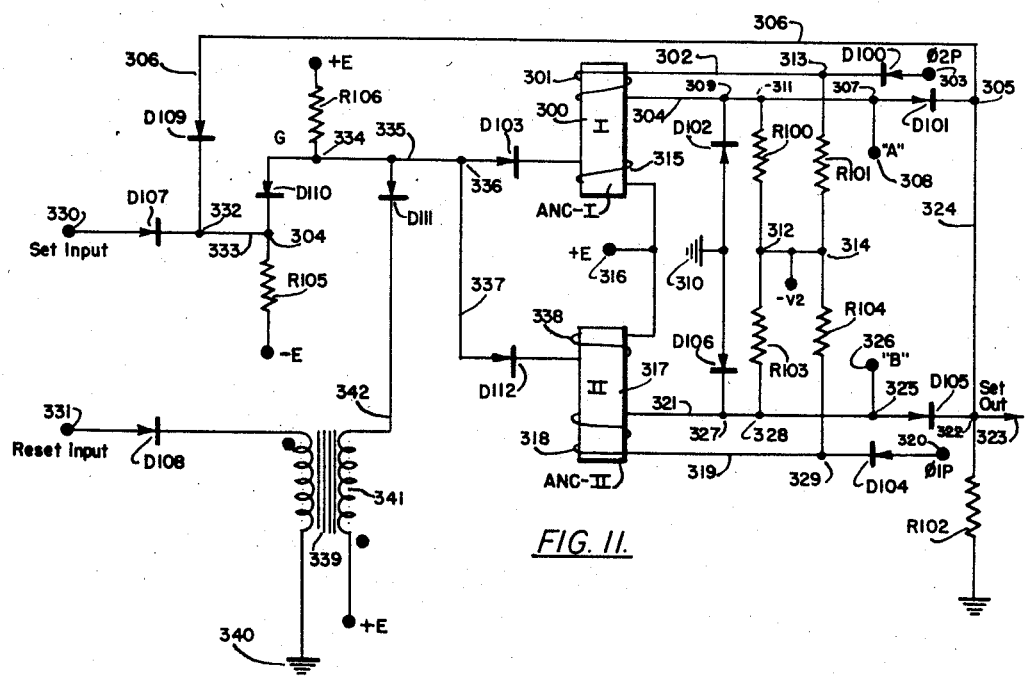
Figure 11 is one form of circuit diagram corresponding to the logical diagram of Figure 10.

Figures 10 and 11 represent one form of the invention which is termed a flip-flop which also has two stable states and employs magnetic cores having the characteristics described above in connection with Figure 1. Figure 10 is a logical diagram for one form of flip-flop circuit according to the invention shown in detail in Figure 11. Comparison with Figure 6 will show that this circuit is obtained from the binary counter previously described, by the elimination of permissive gate G2.

A core 300 of magnetic material is provided with a power winding 301 having one terminal connected to wire 302 leading to the cathode of diode D100. The anode of diode D100 is connected to terminal 303 for the application of phase two power pulses, $\phi 2P$. The other terminal of winding 301 is connected to wire 304 leading to the anode of diode D101, the cathode of which is connected to junction 305 with feedback wire 306. Wire 304 is provided with a junction 307 connected to terminal 308, also labeled "A," for the connection of other equipment similar to that described in connection with Figures 6 and 8. Junction 309 connects the cathode of diode D102 with wire 304. The anode of diode D102 is grounded at 310. Junction 311 connects wire 304 with resistor R100, the other terminal of which is connected to junction 312 leading to a source of negative potential, $-V2$. Wire 302 is provided with a junction 313 with resistor R101, the other terminal of which is connected to junction 314 leading to a source of negative potential, $-V2$. Signal winding 315 on core 300 has one terminal connected to the cathode of buffer diode D103 and its other terminal connected to a source of positive potential, $+E$, at terminal 316. Core 317 has a power winding 318, one terminal of which is connected by wire 319 to the cathode of diode D104. The anode of diode D104 is connected to terminal 320 for application of phase one power pulses, $\phi 1P$. The other terminal of winding 318 is connected to wire 321 leading to the anode of diode D105, the cathode of which is connected to junction 322 with load resistor R102. Junction 322 is connected to "set" output terminal 323 and to wire 324 leading to junction 305. Wire 321 is provided with a junction 325 connected to terminal 326, labeled "B," for the connection with additional equipment, such as a pair of complementers buffed together as shown in Figure 8. Wire 321 is connected to junction 327 leading to the cathode of diode D106. The anode of diode D106 is grounded at 310 in the same manner as diode D102. Wire 321 has a junction 328 with resistor R103, the other terminal of which is connected to junction 312 leading to a source of negative potential, $-V2$. Wire 319 has a junction 329 connecting with one terminal of resistor R104, the other terminal of which is connected to junction 314 leading to a source of negative potential, $-V2$.

Set input terminal 330 is connected to the anode of diode D107 and reset input terminal 331 is connected to the anode of diode D108. Buffer diode D107 has its cathode connected to junction 332 with the cathode of diode D109 and wire 333 leading to junction 304 with resistor R105, and the other terminal of resistor R105 is connected to a source of negative potential, $-E$. The anodes of diodes D110 and D111 are connected to a common junction 334 with resistor R106, the other terminal of which is connected to a source of positive potential, $+E$. Junction 334 is connected by wire 335 to the anode of diode D103. Wire 335 is provided with a junction 336 which is connected by wire 337 to the anode of diode D112, the cathode of which is connected to signal winding 338 on core 317. The other terminal of winding 338 is connected to $+E$ at terminal 316. Diode D109 has its anode connected to feedback wire 306. The cathode of diode D108 is connected to one terminal of the primary of inverter transformer 339, the other terminal of which is grounded at 340. The secondary 341 of transformer 339 has one terminal connected to a source of positive potential, $+E$, and the other terminal connected to the cathode of diode D111 by wire 342.

The circuit of Figure 11 is one physical embodiment of the logical diagram of Figure 10, and will be seen to present dual stable states of operation, which is the characteristic of a flip-flop circuit. One stable state is that of a continuous train of outputs at terminal 323, and occurs in response to a single pulse at set input 330; the other stable state is that wherein no outputs appear at terminal 323, and occurs in response to a reset input at terminal 331. The magnetic amplifiers comprising cores 309 and 317 are pulsed by their respective power pulses, $\phi 2P$ and $\phi 1P$, in the manner described above in connection with Figure 6. Because the inputs of amplifiers I, $Anc_1$, and II, $Anc_2$, of Figures 10 and 11 are connected together by diodes D103 and D112, signals can be accepted at any time interval by the one of the amplifiers which at the time has its power diode, D100 or D104, biased off by the negative going portion of its power pulse. Thus a pulse applied to the set input 330 will establish a potential on wire 324 which is fed back by wire 306 through diode D109, junction 332, wire 333, to raise the potential of the cathode of diode D110. It will be noted that as in the case of D20 in Figure 7, diode D111 already has a positive voltage applied to its cathode through the connection of wire 342, and inverter transformer secondary 341 to source of positive potential, $+E$. Thus the gate G of Figures 10 and 11, comprising the diodes D110 and D111 and resistors R105 and R106, is open, and as long as the potential of junction 334 is maintained, a substantially constant voltage will be established across load resistor R102. This will result in the substantially constant output at terminal 323, as previously described, and represents one steady state condition of the circuit.

If a second pulse, termed a reset pulse, is now applied to input 331, it will pass through diode D108 to the primary of inverter transformer 339 and will appear as a negative going pulse in secondary 341 and will be applied through wire 342 to the diode D111 of the gate. This negative going pulse reduces the potential of junction 334 and closes the gate. There will be output from terminal 323 during this time interval, but the interruption of the D.C. flow by the fall of potential of junction 334 stops signal application to the junction 336 and as the magnetic amplifiers comprising the cores 300 and 317, with their windings and supplemental circuits, are non-complementing, no output will appear at the output terminal 323 during succeeding time intervals. This condition will continue until a pulse is again applied to "set" input terminal 330.

While it is true that after the application of a reset input pulse, the $+E$ potential connected to one terminal of secondary 341 is again applied to the cathode of diode D111, the cathode of diode D110 no longer has a positive potential applied thereto, and the gate will not open. Thus, D.C. flow will not be reestablished until a set pulse is again applied at terminal 330.

Although the operation of Figure 11 has been outlined above, the logical diagram of Figure 10 shows the inclusion of the coupled pair of complementers of Figure 8 and the complete circuit having both a set and reset (zero) output and a set and reset input for operation as a bistable flip-flop.

Figure 12:
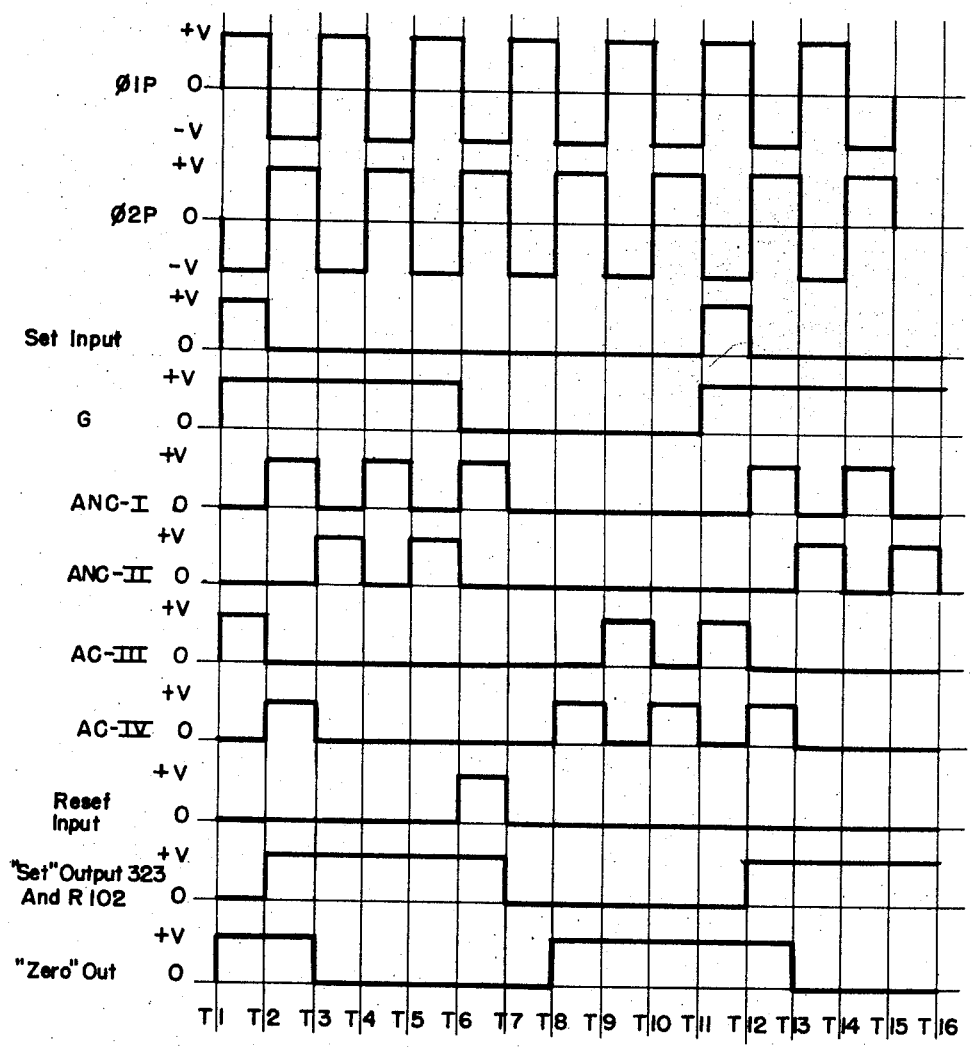
Figure 12 is a waveform diagram with respect to time of one sequence of operation of Figures 10 and 11.

Figure 12 is a time event diagram showing the pulses at the various portions of the circuit of Figures 10 and 11 and their time relation to each other. During the time interval $t1$—$t2$, as shown in Figure 12, non-complementing magnetic amplifier II, $Anc_2$, will accept an input signal shown to be applied at terminal 330. This pulse opens the inhibiting gate G and establishes substantially direct current flow at load resistor R102 with a constant potential at set output 323. This is shown by the voltage level of gate G during the time interval $t1$ to $t6$ and the voltage level on load resistor R102 during the time intervals $t2$ to $t7$, and represents the first stable state of the flip-flop circuit. During this period there is an output at the set output terminal 323. This output also appears alternately at the "A" and "B" terminals 308 and 326 which are connected to the corresponding terminals "A" and "B" of the paired complementers III Ac and IV Ac.

It will be noted from Figure 12, that there is an initial output pulse at zero terminal 206 (Fig. 8) during the time interval t1—t3, because there had been no input at terminals "A" or "B" during the preceding intervals. However, once the steady state D.C. flow is established in load resistor R102, the output of the non-complementers becomes the input of the paired complementers and cuts off their zero output at terminal 206 (Fig. 8), as shown in the diagram of Figure 12, during the time intervals t3 to t7. During the time interval t6—t7, a reset pulse is applied to terminal 331 closing the gate G and interrupting the direct current flow at load resistor R102, and the set output at terminal 323, as shown, during the time interval t7—t8. After the output at terminal 323 is cut off, which means no input at the terminals "A" and "B," the paired complementers III Ac and IV Ac, produce outputs which appear at zero output terminal 206 during the time intervals t8 to t13, as shown in Figure 12.

Figure 13:
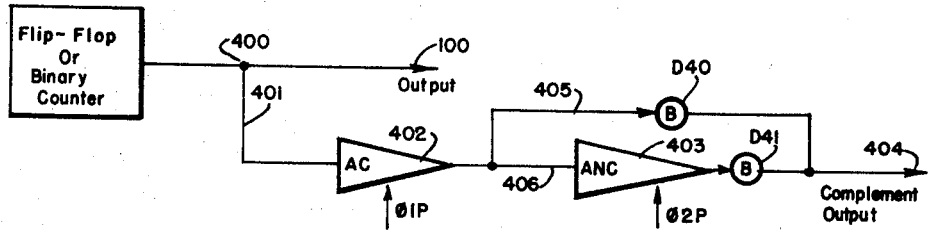
Figure 13 is a logical diagram of one form of means producing a complement output according to the invention.
Figure 14:
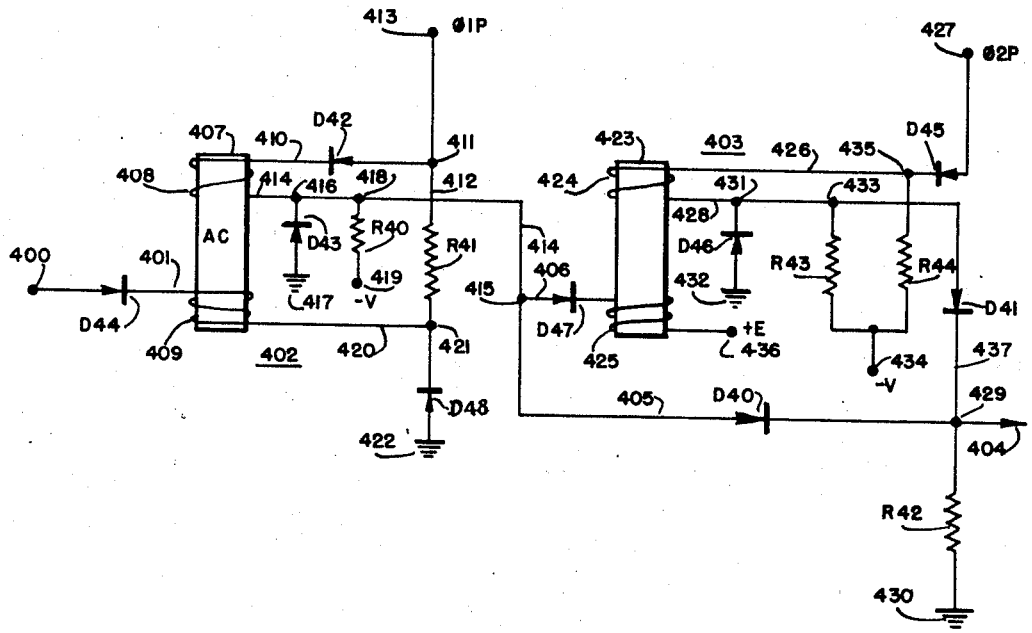
Figure 14 is a detailed circuit diagram for producing the results of the logical diagram of Figure 13.

This represents the second steady state condition of the combined circuit, which will continue until a second set input is applied to set input terminal 330, as shown in Figure 12, during the time interval t11—t12. This set input reestablishes the conditions established by the set input applied during the time interval t1—t2, and again establishes the substantially constant current flow in load resistor R102, returning the circuit to its first steady state condition.

Where it is desirable to have complementary outputs from either of the devices of Figures 7 and 11 for the two states described, the device shown in Figures 13 and 14 may be connected to the output terminal 100 or 323.

Figure 13 is a logical diagram showing the output terminal 100 of a binary counter such as disclosed in Figure 7, or output terminal 323 of a flip-flop circuit as disclosed in Figure 10, connected to input terminal 400. Terminal 400 is connected to complementing magnetic amplifier 402 by wire 401. The output of 402 is supplied through wire 406 as input to noncomplementing magnetic amplifier 403. Magnetic amplifiers 402 and 403 are connected together through diodes D40, D41 and wire 405 to provide a complementing output at terminal 404. An examination of the diagram will show that in the absence of any signal at terminals 100 and 400 a substantially steady state positive voltage will be maintained at terminal 404.

In Figure 14 is shown one form of detailed circuit corresponding to the logic of the diagram of Figure 13. Complementing magnetic amplifier 402 has a core 407 of magnetic material provided with a power winding 408 and a signal winding 409. Power winding 408 has one terminal connected by wire 410 to the cathode of diode D42, the anode of which is connected to junction 411 with wire 412 leading to a source of power pulses of phase one power ($\phi$1P) connected to terminal 413. The other terminal of power winding 408 is connected to wire 414 leading to junction 415, with wires 405 and 406. A diode D43 has its cathode connected to junction 416 with wire 414 and its anode grounded at 417. Resistor R40 has one terminal connected to junction 418 with wire 414 and the other terminal connected to negative voltage source —V at 419. Diode D43 and resistor R40, together with their terminal connections, form the sneak suppressor circuit for magnetic amplifier 402.

Signal winding 409 is connected to input terminal 400 through buffer diode D44 by wire 401. The other terminal of winding 409 is connected by wire 420 to junction 421 with wire 412. Junction 421 is connected to the cathode of diode D48, the anode thereof being grounded at 422. Wire 412 contains resistor R41 between junctions 411 and 421.

Non-complementing magnetic amplifier 403 has a magnetic core 423 provided with a power winding 424 and a signal winding 425. One terminal of power winding 424 is connected by wire 426 to the cathode of diode D45, the anode of which is connected to a source of phase two power pulses ($\phi$2P) at terminal 427. The other terminal of winding 424 is connected by wire 428 to the anode of buffer diode D41, the cathode of which is connected by wire 437 and junction 429 to complementing output terminal 404. Junction 429 is grounded at 430 through load resistor R42.

Diode D46 has its cathode connected to junction 431 with wire 428 and its anode connected to ground at 432. Resistor R43 has one terminal connected to junction 433 with wire 428 and its other terminal connected to a source of negative voltage —V at 434. Resistor R44 has one terminal connected to negative voltage source —V at 434 and the other terminal connected to junction 435 with wire 426. Diode D46 and resistor R43 with their terminal connections comprise the sneak suppressor circuit of non-complementing magnetic amplifiers 403 and D46, wire 426, junction 435 and R44 with their terminal connections comprise the restoring circuit providing reverse current flow for core 423 sufficient to flip it back as previously described above. Signal winding 425 has one terminal connected to junction 415 through diode D47 and its other terminal is connected to +E at 436. Reference is made to the discussion above in connection with Figures 2 and 4 for the functions of the circuit elements of complementing magnetic amplifier 402 and non-complementing magnetic amplifier 403.

Figure 15:
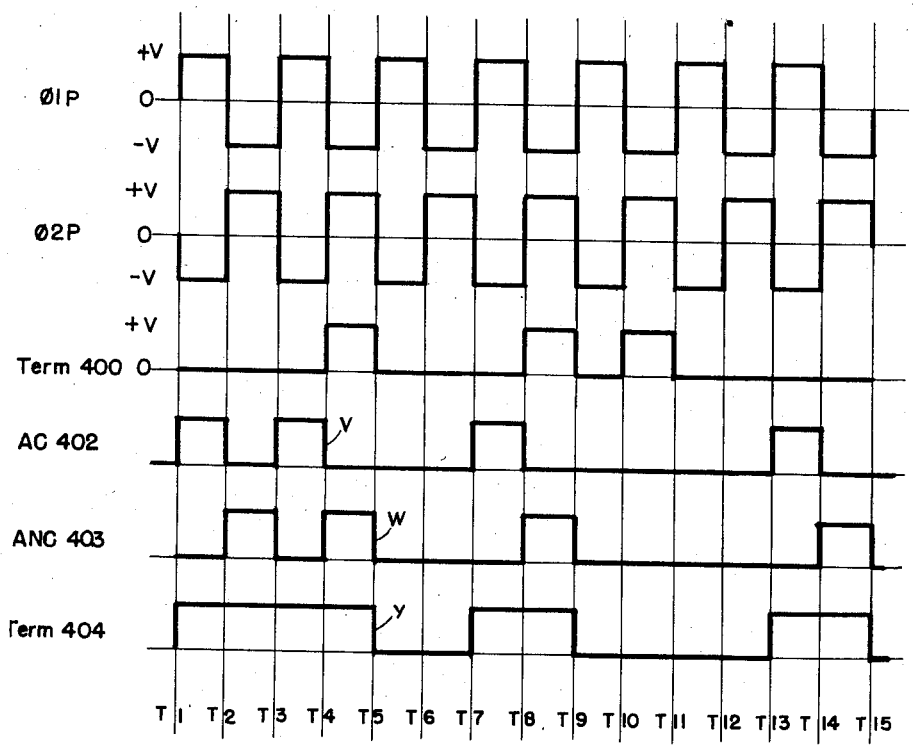
Figure 15 is a waveform diagram with respect to time of one sequence of operation of Figures 13 and 14.

As shown in Figure 15, magnetic amplifiers 402 and 403 supplement each other to produce a substantially steady voltage of +V at terminal 404 when there is no input at junction terminal 400. In the absence of input, complementing magnetic amplifier 402 produces output which is supplied by wire 406 as input to non-complementing magnetic amplifier 403 which also produces output of opposite phase to the output of magnetic amplifier 402, as shown by curves V and W. Curve Y shows the combined output of the two magnetic amplifiers at 404 which will be seen to return to zero upon the appearance of a signal at junction 400.

Figure 16 is a logical diagram of a modified form of bistable device according to the invention capable of accepting inputs of either power pulse phase, $\phi$1P or $\phi$2P, at any time. The application of input signals to the step terminal 500 alone will cause the device to operate as a binary counter. The application of input signals to the jam-to-zero terminal 501 and jam-to-one terminal 502 only will cause the device to operate as a flip-flop.

Figure 17 presents one form of specific bistable circuit which corresponds to the logic of the diagram of Figure 16. A non-complementing magnetic amplifier I has a core 503 with power winding 504 and signal winding 505. One terminal of power winding 504 is connected by wire 506 to the anode of diode D60 the cathode of which is connected to output terminal 507 at junction 508 by wire 509. The other terminal of power winding 504 is connected to a source 510 of phase one power pulses ($\phi$1P) at junction 511 by wire 512. Signal winding 505 has one terminal connected to the anode of diode D61 and the other terminal connected to one terminal of secondary 513 of transformer 514(T).

Non-complementing magnetic amplifier II has a core 515 with power winding 516 and a signal winding 517. One terminal of power winding 516 is connected by wire 518 to the anode of diode D62, the cathode of which is connected to junction 519 with wire 509. The other terminal of power winding 516 is connected to a source 520 of phase two power pulses ($\phi$2P) by wire 521. One terminal of signal winding 517 is connected to the anode of diode D63 and the other terminal is connected to the remaining terminal of secondary 513. The primary 522 of transformer 514 has one terminal connected to junction 511 and the other terminal connected to ground. The second terminals 524 of both phase one and phase two power pulse sources are likewise grounded.

Gate G comprises resistances R60, R61 and R62 together with diodes D64, D65 and D66. Resistance R60 has one terminal connected to a source 525 of positive voltage +V and the other terminal connected to junction 526 with the anodes of diodes D64 and D65 and the cathode of diode D66. The anode of diode D66 is grounded at 527. The cathode of diode D64 is connected to junction 528 with one terminal of resistance R61, the other terminal of which is connected to a source 529 of negative voltage −V.

Step terminal 500 is connected by wire 530 to the anode of diode D67. The cathodes of diodes D67 and D61 are joined by a wire 531. Wire 530 is connected at junction 532 with wire 533 leading to junction 528. Wire 531 contains junction 534 which is connected to the cathode of diode D68 and one terminal of resistance R63. The anode of diode D68 is grounded at 535 and the other terminal of resistance R63 is connected to a source 536 of negative voltage −V. The cathode of diode D65 is connected to terminal 537 of resistance R62 by wire 538. The other terminal 539 of resistance R62 is connected to a source of negative potential −V.

Diode D69 has its anode connected to junction 526 to receive output from gate G and its cathode connected to junction 540 with the cathode of diode D70 and wire 541 leading to center tap 542 of secondary coil 513 of transformer 514. The anode of diode D70 is connected to jam-to-zero terminal 501 by wire 543. The cathode of diode D71 and one terminal of resistance R64 are connected to junction 544 with wire 541. The anode of diode D71 is grounded at 545 and the other terminal of resistance R64 is connected to a source 546 of negative potential −V.

Jam-to-one terminal 502 is connected by wire 547 to the anode of diode D72, the cathode of which is connected to junction 548 with wire 531 by wire 549. Wire 549 is connected to the cathodes of diodes D63 and D73 at junction 550. The anode of diode D73 is connected to junction 551 with wire 552 which joins junctions 508 and terminal 537 of resistance R62. Junction 508 is grounded at 553 through load resistance R65.

Figure 18:
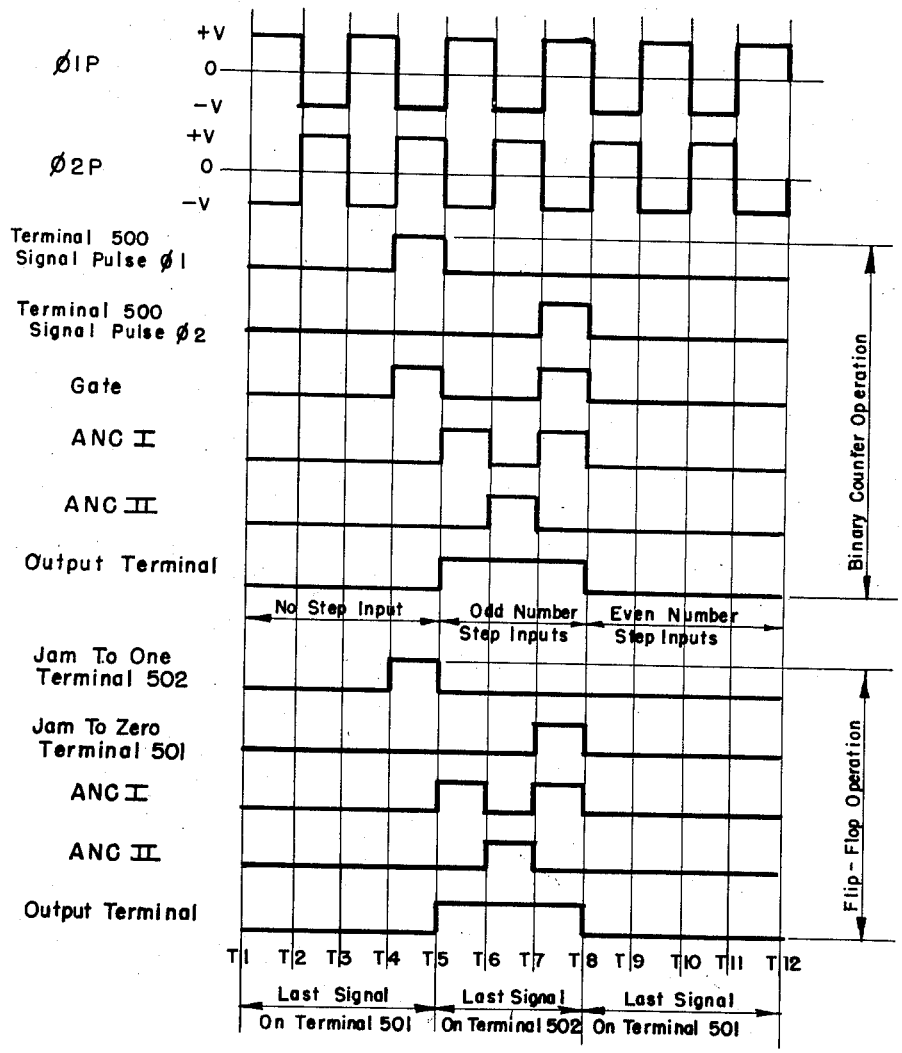
Figure 18 is a waveform diagram with respect to time of one sequence of operation of Figures 16 and 17.

One sequence of the operation of the circuit of Figure 17 is shown in Figure 18. If it be assumed that neither core has been reset, then during the time interval t1—t2, φ1P is positive and current will flow from terminal 510 through winding 504, diode D60 and load resistance R65 to ground 553. This current flow in winding 504 flips the core 503 and induces a voltage in winding 505 which is positive at the anode of diode D61 and negative at the upper terminal of secondary 513. The flipping action of the core 503 presents a high impedance, as discussed in connection with Figures 1–5, and only a small voltage drop appears across load resistance R65. At the same time, a voltage is produced at the primary 522 of transformer 514 equal in magnitude to that induced in winding 505. This voltage appears in such a direction between the center tap 542 of secondary 513 and the junction of the upper terminal of secondary 513 and the lower terminal of winding 505 as to cancel the voltage induced in winding 505. As a result, no current flows in winding 505 when the core 503 is flipped as described above.

When the phase one power pulse, φ1P, is negative, as shown during the interval t2—t3 in Figure 18, the diode D60 prevents current flow in the upper winding 504. Current flowing in primary 522 of transformer 514 produces a voltage at the upper terminal of secondary 513 which is positive with respect to the center tap 542, and if there is no step signal at step input terminal 500, current will flow from ground potential and diode D71 through winding 505, diode D61 and resistance R63, flipping core 503 again.

Reference to Figure 18 shows that phase two power pulse, φ2P, is of opposite phase or one hundred eighty degrees out of phase with respect to φ1P and it will therefore appear from examination of Figure 17 that the same sequence of events occurs for core 515, with the difference in phase relation of the power pulses φ1P and φ2P affecting only the relative times of flipping of the two cores.

The above description of operation describes the "zero" state of the bistable device. No output is produced across the load resistance R65 by either core 503 or core 515. If now a step or signal pulse, for example of phase one, so termed because it occurs during the negative going portion of the phase one power pulse, as shown in Figure 18, is applied to step input terminal 500, current will flow through diode D67 and resistor R63, raising the cathodes of diodes D61, D63, D68 and D73 above their anode potentials. In addition the step pulse is applied to the cathode of diode D64 in gate G via conductor 533 but a pulse is not transmitted therethrough since at this time the cathode of diode D65 in gate G is at −V potential. However the potential rise at the cathodes of the aforementioned four diodes will prevent current from flowing in the lower winding 505 of core 503 and the core will be reset. Then, when phase one power pulse, φ1P, again becomes positive, as shown during interval t3—t4 in Figure 18, the winding 504 on core 503 will appear as a low impedance to current flow and an output will appear across load resistance R65. This output is also applied to the cathode of diode D65 in gate G via wire 552, thereby alerting this gate to step pulses from terminal 500. Further this output is applied to resistance R63 through wire 552, diode D73 and wire 549 and blocks the setting current in the upper winding 517 of core 515, so that core 515 produces an output across load resistance R65 during the next interval, t4—t5 of Figure 18, when phase two power pulse, φ2P, becomes positive. The output of core 515 is also applied as an alerting signal to the cathode of diode D65 in gate G and to resistance R63 through diode D73, once again preventing core 503 from being set, so that core 503 produces an output and the cycle repeats.

If another step pulse is applied at the step input terminal 500, the gate comprising resistances R60, R61 and R62 together with diodes D64, D65 and D66 will provide an output which is applied to the center tap 542 of primary 513 of transformer 514, raising the voltage level of transformer 514 and resetting that particular core which happens to have the negative portion of its power pulse applied to it.

The jam-to-zero input terminal 501 is provided so that the device may be cleared to the no output condition, the jam-to-zero signal being conveyed directly to center tap 542. The jam-to-one input terminal 502 is provided so that the device can be cleared to the "one" condition, the jam-to-one signal being applied as a potential at the cathodes of diodes D61, D63, D68 and D73, raising them above their anode potentials and preventing the flow of current as described above.

It will be seen that the application of signal pulses alternately to terminals 501 and 502 will change the state of the device from "zero" to "one" and back again so that the device operates as a flip-flop. On the other hand, successive pulses applied to terminal 500 alone operate the device as a binary counter. Direct current output is present on one line only.

Where a non-zero indication of the zero state is desired, two additional magnetic amplifiers of the complementing type discussed above may be connected to the terminals 554 and 555 in Figure 17 with their outputs buffed together. When the device of Figure 17 operates as a binary counter and is in the initial "zero" state described above, a step input pulse applied at terminal 500 causes an output at terminal 507 as described above. The presence of this output is an indication that an odd number of step input pulses has been applied to step input terminal 500. This output continues and is maintained by the feedback action described, until a second step input pulse is applied which acts to raise the potential at center tap point 544 on secondary winding 513 thereby interrupting the feedback action and causing the potential on output terminal 507 to drop to zero. The absence of any output at terminal 507 is an indication that an even number of step input pulses (or none at all) has been applied to step input terminal 500.

On the other hand, when the device of Figure 17 operates as a flip-flop the same presence or absence of potential at output terminal 507 is utilized to indicate to which terminal, 501 or 502, an input pulse has been applied. The presence of potential at output terminal 507 indicates that the last input signal was applied to jam-to-one terminal 502 and the absence of potential indicates that the last input signal was applied to jam-to-zero terminal 501.

In general, these two modes of operation are regarded as separate and distinct functions of the device of Figure 17, even both modes of operation of the same or additional units of equipment may be used in combination in the same computer.

While there has been presented above a particular embodiment of the invention, now believed to be preferred, many variations will readily suggest themselves to those skilled in the art. All of these different forms which fall within the spirit of the invention are intended to be covered by the appended claims wherein generic terms are employed for the express purpose of including the many equivalent structures by which the present results may be obtained.

What is claimed is:

1. In combination in a binary counter device, a pair of non-complementing magnetic amplifiers each having an input and an output and adapted to produce an output signal in response to an input signal, a pair of complementing magnetic amplifiers each having an input and an output and adapted to produce an output signal in the absence of an input signal, said non-complementing magnetic amplifiers having their outputs connected to a common output terminal for the device, said complementing magnetic amplifiers having their outputs connected together to a second common output for the device and each of their inputs coupled to the output of a respective one of said non-complementing magnetic amplifiers, input means for said pairs of non-complementing magnetic amplifiers and feedback means for said non-complementing magnetic amplifiers coupling the output of said non-complementing amplifiers to their inputs.

2. The combination set forth in claim 1, a first gate means connected between said input means and said non-complementing amplifiers, a second gate means connected between said input means and said first gate, said feedback means being connected to both said gate means between the output of said non-complementing amplifiers and said input means whereby a steady state direct current flow can be established and interrupted at said output of said non-complementing amplifiers.

3. The combination set forth in claim 2, further comprising pulse input means connected to said device to direct the output thereof from one common output to the other.

4. In combination in a bistable device, a pair of magnetic amplifiers connected to a common output means, means to pulse said amplifiers alternately and set input means connected to condition said device alternately for one of two stable states, said amplifiers comprising magnetic cores having a characteristic hysteresis loop with substantially parallel sides over a large part of said loop; each said magnetic core having a winding thereon having one terminal connected to said pulsing means and the other terminal connected to said common output and a second winding thereon connected to said input means; a gating circuit connected between said input means and said pair of amplifiers and comprising a pair of diodes arranged to maintain and interrupt a direct current flow at said common output, and feedback means connecting said gate and said output; each said amplifier having a sneak pulse suppressor circuit comprising a rectifier means and an impedance connected to said winding connected to said pulsing means, and to a source of potential, and means to hold the terminal voltage of said second windings at a desired level during selected time intervals; a reveres current circuit comprising an impedance connected to each of said power windings to restore the magnetic cores to a desired condition, and a second set of amplifiers comprising a complementing amplifier having windings thereon to produce an output signal only in the absence of an input signal and a non-complementing amplifier having windings thereon to produce an output signal only in response to an input signal, said last two amplifiers being connected to provide a complementing output.

5. In combination in a bistable circuit, a pair of coupled non-complementing magnetic amplifiers adapted to produce an output signal in response to an input signal comprising magnetic cores having at least one winding thereon wherein said core and at least one winding in combination offer (discretely) a high or low impedance to current passing said winding, said cores having characteristics hysteresis curves of substantially parallelogram form, means to pulse said non-complementers in alternate phase relation, a common load for said non-complementers and input means to place said circuit in one of two stable states and feedback means to maintain one of said states, said feedback means connected between said common load and said input means, said input means having a single gating circuit as a part thereof, said gate circuit being controlled at least in part by the potential of said feedback means, said gating circuit comprising a pair of diodes connected to maintain a direct current flow at said common load, a wave inverter means connected between said input means and said gating circuit and constructed to block said first-named gating circuit and to interrupt the direct current flow at said common load, said wave inverter being connected to a positive voltage source independent of its wave inverting function, a pair of coupled amplifiers connected to said non-complementers and comprising a complementer adapted to produce an output signal in the absence of an input signal and a non-complementer adapted to produce an output signal in the presence of an input signal and means to pulse said last amplifiers in alternate phase relation.

6. In combination in a bistable device, a pair of coupled non-complementing magnetic amplifiers adapted to produce an output in the presence of an input signal, a pair of coupled magnetic amplifiers comprising a complementer adapted to produce an output in the absence of an input signal and a non-complementer adapted to produce an output in the presence of an input signal, each said non-complementing amplifier and said complementing amplifier having a magnetic core member possessing a characteristic hysteresis curve having a substantially rectangular form said coupled non-complementers having their outputs connected to a common output terminal connected to said complementer, input means for said device, feedback means, gate means connected between said input means and said non-complementers, said feedback means being connected to said gate means between the output of said non-complementers and said input means whereby a steady state direct current flow can be established and interrupted at said output of said non-complementers to establish successively the stable states of said bistable device.

7. A bistable device comprising: a first non-complementing magnetic amplifier having an input and an output; a second non-complementing magnetic amplifier having an input and an output; a first complementing magnetic amplifier having an input and an output; a second complementing magnetic amplifier having an input and an output; a first gate having an output, a first input, and a second input, said first gate producing an output pulse at said output if an input pulse is applied to said first input in the absence of the application of an input pulse to said second input; a second gate having an output, a first input, and a second input, said second gate producing an output pulse from said output if input pulses are simultaneously applied to said first and to said second inputs; means for inversion of waveform polarity having an input and an output; buffer means for connecting said outputs of said first and said second non-complementing magnetic amplifiers to a first common terminal; feedback means for connecting said first common terminal to said first input of said second gate; buffer feedback means for connecting said first common terminal to said first input of said first gate; buffer means for connecting said output of said first gate to said input of said first non-complementing magnetic amplifier and to said input of said second non-complementing magnetic amplifier; buffer means for connecting said output of said second gate to said input of said means for inversion of waveform polarity; means for connecting said output of said means for inversion of waveform polarity to said second input of said first gate; means for connecting said output of said first non-complementing magnetic amplifier to said input of said first complementing magnetic amplifier; means for connecting said output of said second non-complementing magnetic amplifier to said input of said second complementing magnetic amplifier; buffer means for connecting said outputs of said first and said second complementing magnetic amplifiers to a second common terminal; buffer means for applying step input pulses to said first input of said first gate; means for applying said step input pulses simultaneously to said second input of said second gate; buffer means for applying jam-to-one input pulses to said inputs of said first and said second non-complementing magnetic amplifiers; buffer means for applying jam-to-zero input pulses to said input of said means for inversion of waveform polarity; and means for connecting said output of said second gate to a carry output terminal; whereby a substantially constant output is produced at one of said first or said second common terminals in response to the application of an odd number of said step input pulses, a substantially constant output is produced at the other of said first or said second common terminals in response to the application of an even number of said step input pulses, a pulse is produced at said carry output terminal in response to application of alternate of said step input pulses, a substantially constant output is produced at said first common terminal in response to the application of said jam-to-one input pulses, a substantially constant output is produced at said second common terminal in response to application of said jam-to-zero input pulses, and the application of said step input pulses may be without time separation.

8. A bistable network comprising a pair of non-complementing magnetic amplifiers, each non-complementing amplifier having; an input and an output terminal, a magnetic core member having a substantially rectangular hysteresis curve, a power winding on each said core, means connected to said power windings to pulse said non-complementing amplifiers in alternate phase relation, and a common load connected to said output terminals, a first gate circuit having a plurality of inputs and an output coupled at said output to said input terminals of said non-complementing amplifiers, said first gate being inhibited in response to a signal applied to a selected one of said inputs, a second gate circuit coupled to said first gate at said selected one of said inputs for inhibiting said first gate and feed back means coupling said common load to both said gate circuits.

9. The combination set forth in claim 8 further comprising signal input means connected to both said gate circuits.

10. The bistable network defined in claim 8 further comprising signal inversion apparatus interposed between said first and second gate circuits.

11. The bistable network defined in claim 10 further comprising a first complementing magnetic amplifier, having an input and an output terminal and a magnetic core member which exhibits a substantially rectangular hysteresis curve and a power winding on said core, said first complementing amplifier being adapted to produce an output signal in the absence of an input signal and being connected at its input terminal to the output terminal of one non-complementing magnetic amplifier in the pair; and a second complementing magnetic amplifier having an input terminal and an output terminal and a magnetic core member which exhibits a substantially rectangular hysteresis curve and a power winding on said core, said second complementing amplifier being adapted to produce an output signal in the absence of an input signal and being connected at its input terminal to the output terminal of the other non-complementing magnetic amplifier in the pair.

12. The bistable network defined in claim 11 further comprising both a second common load and means for alternately pulsing said complementing amplifiers, coupled to said power windings of said complementing amplifiers.

13. The bistable device defined in claim 11 further comprising a first means selectively coupled to said inversion apparatus for causing only the first and second complementing amplifiers to produce output signals and a second means selectively coupled to said pair of non-complementing magnetic amplifiers for causing only the pair of non-complementing magnetic amplifiers to produce output signals.

14. The bistable device defined in claim 11 further comprising means selectively coupled to said first and second gating circuits for enabling the first and second complementing amplifiers to produce output signals only if said non-complementing magnetic amplifiers are producing output signals and for enabling said pair of non-complementing magnetic amplifiers to produce output signals only if said complementing amplifiers are producing output signals.

15. In combination a pair of non-complementing magnetic amplifiers connected together at their inputs, each of said magnetic amplifiers having a magnetic core member which exhibits a substantially rectangular hysteresis curve, a power winding on said core, and adapted to produce an output signal in response to an input signal, a pair of complementing magnetic amplifiers connected together at their inputs, each of said complementing magnetic amplifiers having a magnetic core member which exhibits a substantially rectangular hysteresis curve, a power winding on said core and adapted to produce an output signal in the absence of an input signal, said non-complementing magnetic amplifiers having their outputs connected to a common output terminal, said complementing magnetic amplifiers having their outputs connected together to a second common output terminal, input means for said pairs comprising at least one gating circuit connected to said non-complementing magnetic amplifiers, and feedback means coupling the common output terminal of said non-complementing magnetic amplifiers to said input means.

References Cited in the file of this patent

UNITED STATES PATENTS

| | | |
|---|---|---|
| 2,654,080 | Browne | Sept. 29, 1953 |
| 2,709,798 | Steagall | May 31, 1955 |
| 2,710,952 | Steagall | June 14, 1955 |
| 2,729,754 | Steagall | Jan. 3, 1956 |
| 2,729,755 | Steagall | Jan. 3, 1956 |

UNITED STATES PATENT OFFICE
CERTIFICATE OF CORRECTION

Patent No. 2,911,543

November 3, 1959

William F. Steagall

It is hereby certified that error appears in the printed specification of the above numbered patent requiring correction and that the said Letters Patent should read as corrected below.

Column 5, line 35, for "25" read -- 24 --; column 13, line 6, after "core" insert -- 200 --; column 16, line 8, for "309" read -- 300 --; column 22, line 10, for "reveres" read -- reverse --.

Signed and sealed this 25th day of October 1960.

(SEAL)
Attest:

KARL H. AXLINE
Attesting Officer

ROBERT C. WATSON
Commissioner of Patents